United States Patent
Ushigami et al.

(10) Patent No.: US 6,613,160 B2
(45) Date of Patent: Sep. 2, 2003

(54) METHOD TO PRODUCE GRAIN-ORIENTED ELECTRICAL STEEL SHEET HAVING HIGH MAGNETIC FLUX DENSITY

(75) Inventors: Yoshiyuki Ushigami, Futtsu (JP);
Shuichi Nakamura, Futtsu (JP);
Kenichi Murakami, Kitakyushu (JP);
Hiroyasu Fujii, Kitakyushu (JP);
Norihiro Yamamoto, Kitakyushu (JP)

(73) Assignee: Nippon Steel Corporation, Tokyo (JP)

(*) Notice: Subject to any disclaimer, the term of this patent is extended or adjusted under 35 U.S.C. 154(b) by 0 days.

(21) Appl. No.: 09/924,353

(22) Filed: Aug. 7, 2001

(65) Prior Publication Data

US 2002/0038678 A1 Apr. 4, 2002

(30) Foreign Application Priority Data

| Aug. 8, 2000 | (JP) | 2000-240300 |
| Aug. 9, 2000 | (JP) | 2000-241573 |
| Sep. 5, 2000 | (JP) | 2000-268320 |
| Jan. 12, 2001 | (JP) | 2001-005595 |
| Jan. 12, 2001 | (JP) | 2001-005609 |

(51) Int. Cl.$^7$ ............................................. H01F 1/147
(52) U.S. Cl. ................................. 148/113; 148/111
(58) Field of Search ................................. 148/110–113

(56) References Cited

U.S. PATENT DOCUMENTS

| 3,785,882 A | 1/1974 | Jackson | 148/113 |
| 5,346,559 A | * 9/1994 | Ushigami et al. | 148/111 |
| 6,280,534 B1 | * 8/2001 | Senda et al. | 148/113 |

FOREIGN PATENT DOCUMENTS

| JP | 30-3651 | 5/1955 |
| JP | 40-15644 | 7/1965 |
| JP | 51-13469 | 4/1976 |
| JP | 58-26405 | 6/1983 |
| JP | 62-86175 | 4/1987 |
| JP | 62-45285 | 9/1987 |
| JP | 64-83620 | 3/1989 |
| JP | 1-290716 | 11/1989 |
| JP | 2-77525 | 3/1990 |
| JP | 2-182866 | 7/1990 |
| JP | 6-17129 | 1/1994 |
| JP | 6-212262 | 8/1994 |
| JP | 7-118750 | 5/1995 |
| JP | 8-32929 | 3/1996 |
| JP | 9-256051 | 9/1997 |

* cited by examiner

Primary Examiner—John Sheehan
(74) Attorney, Agent, or Firm—Kenyon & Kenyon

(57) ABSTRACT

The present invention, in a method to produce a grain-oriented electrical steel sheet, proposes conditions for stable production by clarifying the causes by which secondary recrystallization is rendered unstable when primary recrystallization is controlled by raising the heating rate of decarburization annealing.

The primary recrystallization structure is controlled by changing the heating rate and the oxide layer of a steel sheet is controlled by changing the conditions of soaking annealing in the decarburization annealing. The composition of the (Al, Si)N inhibitor is also controlled in the nitriding treatment thereafter.

6 Claims, 11 Drawing Sheets

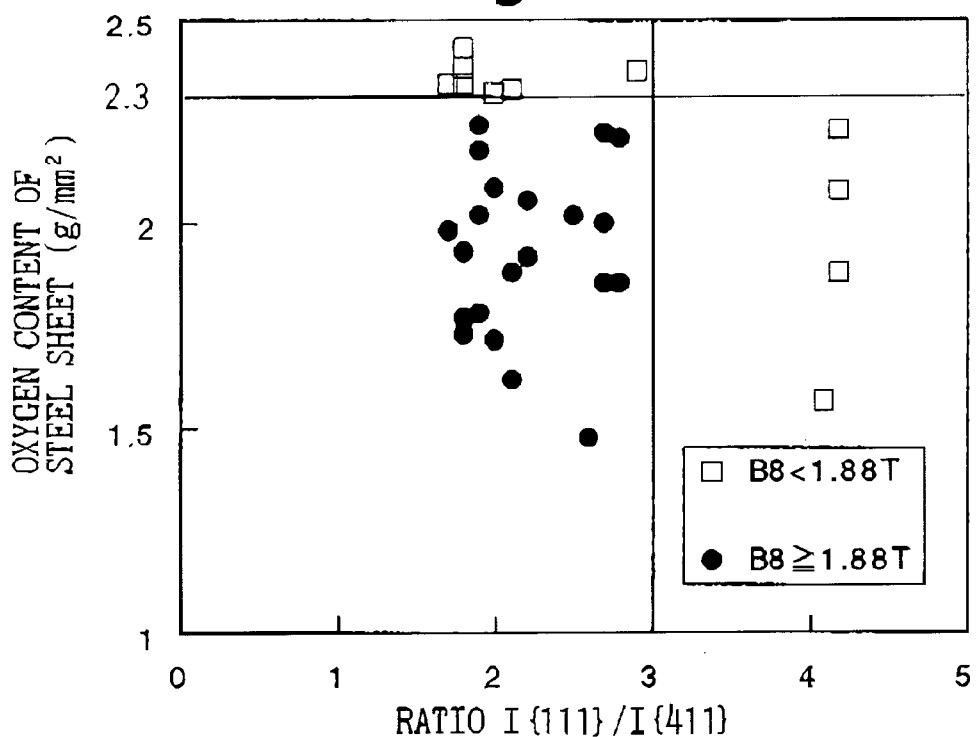
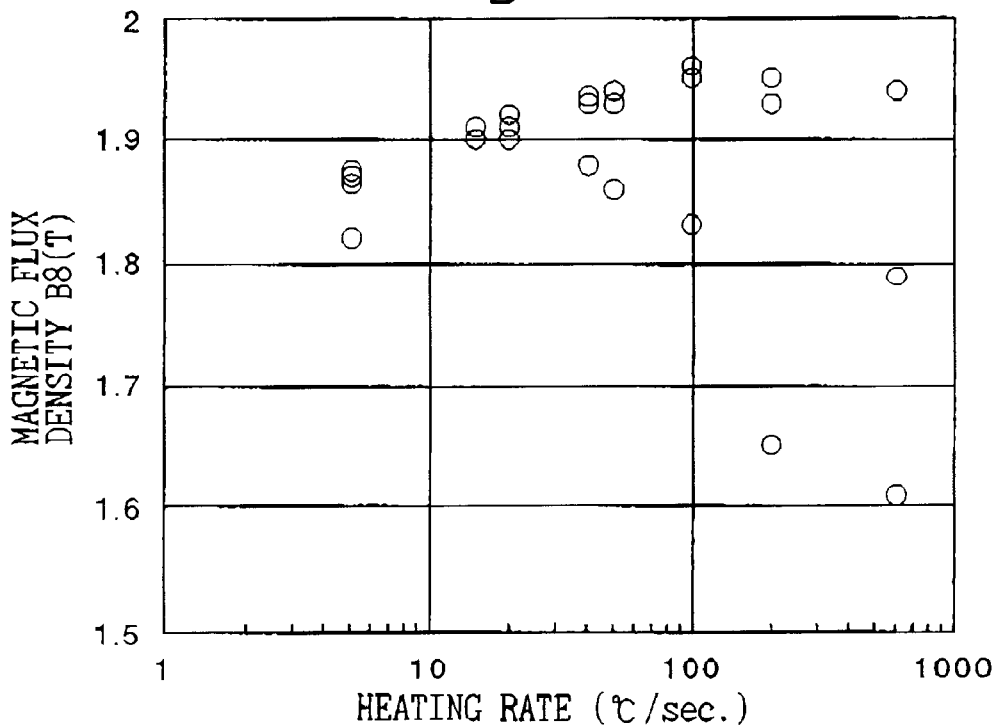

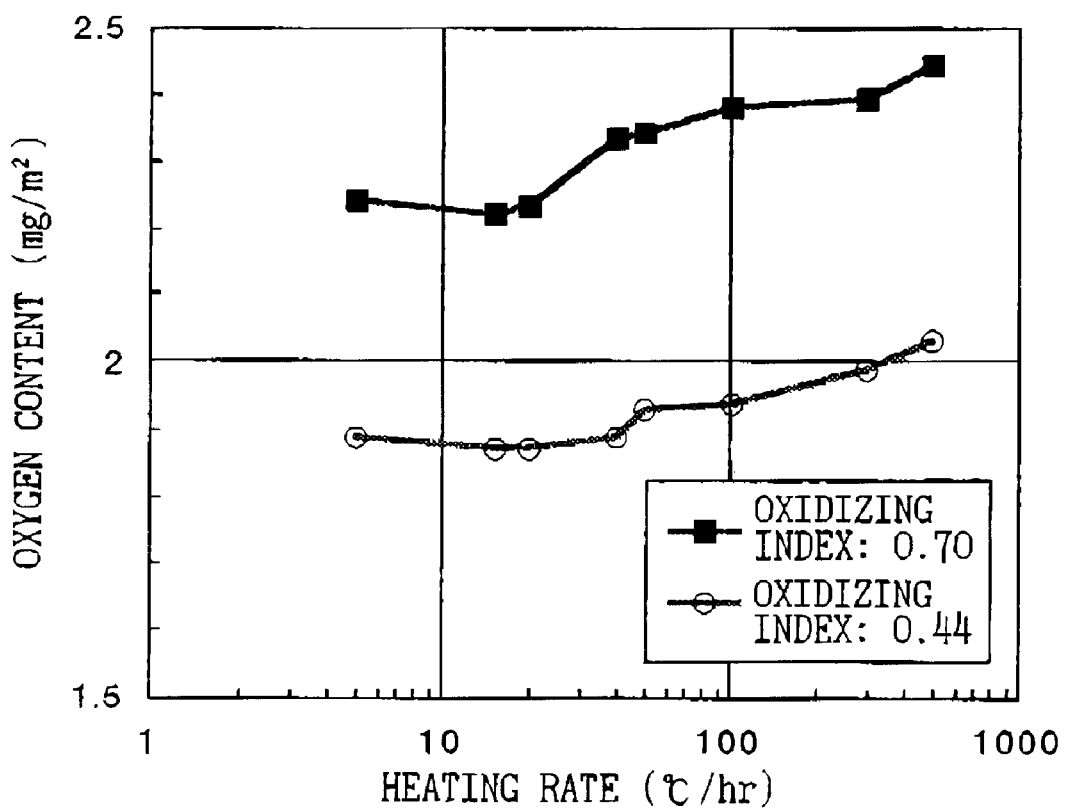

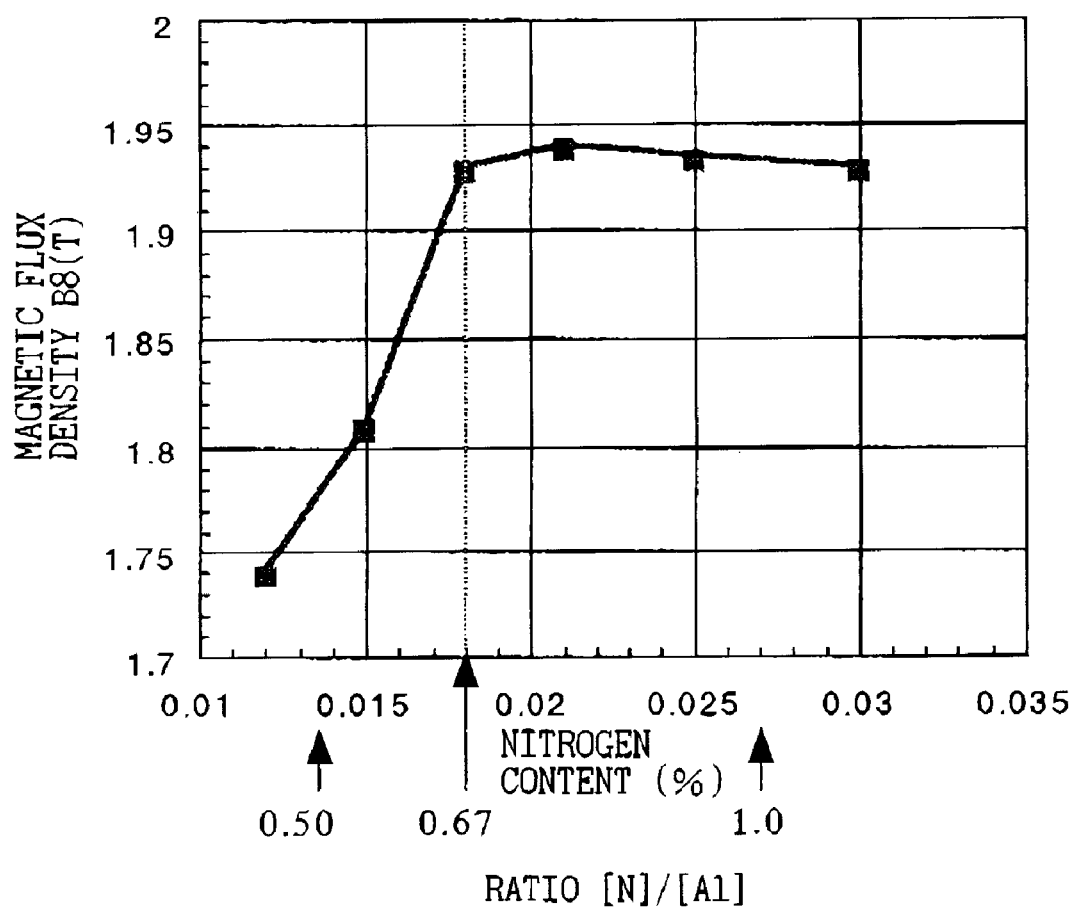

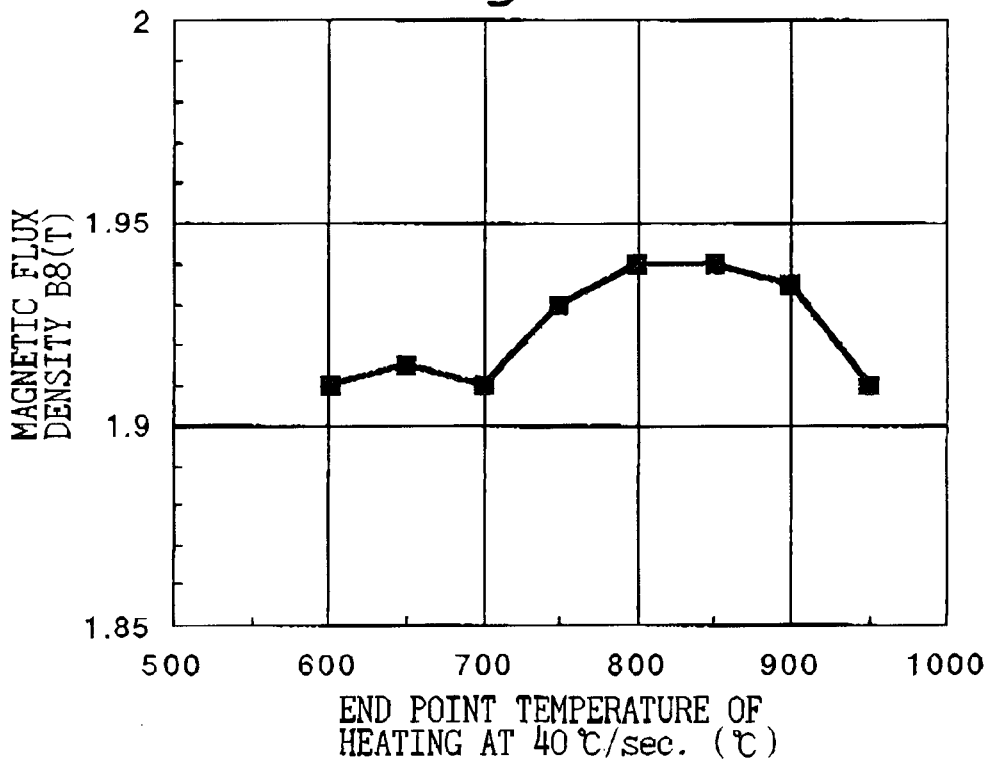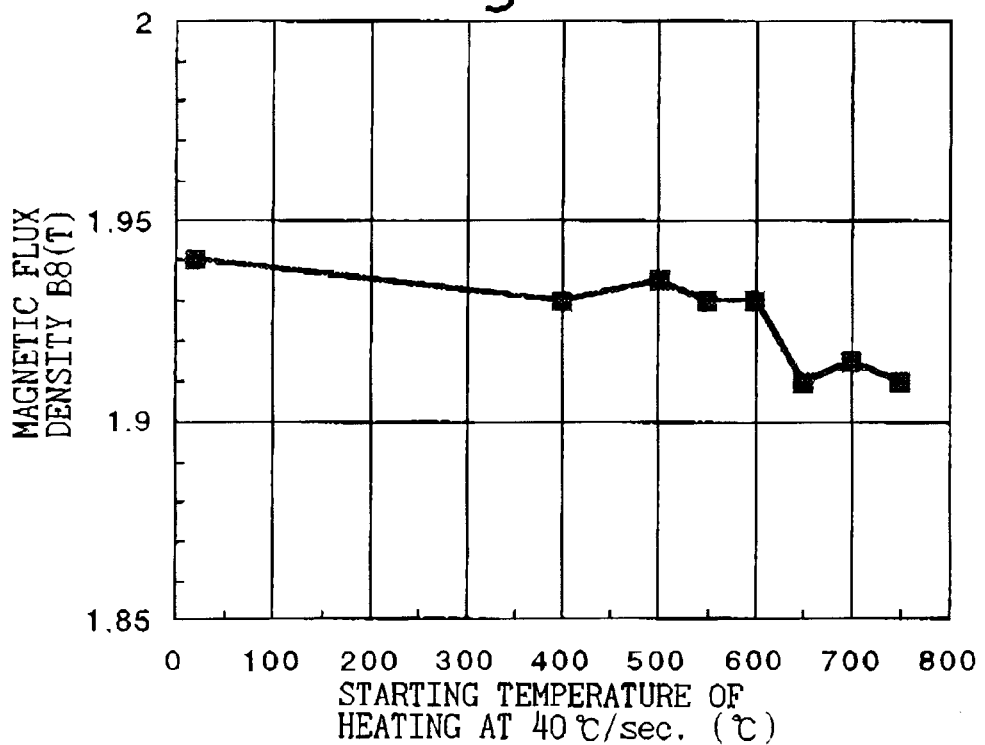

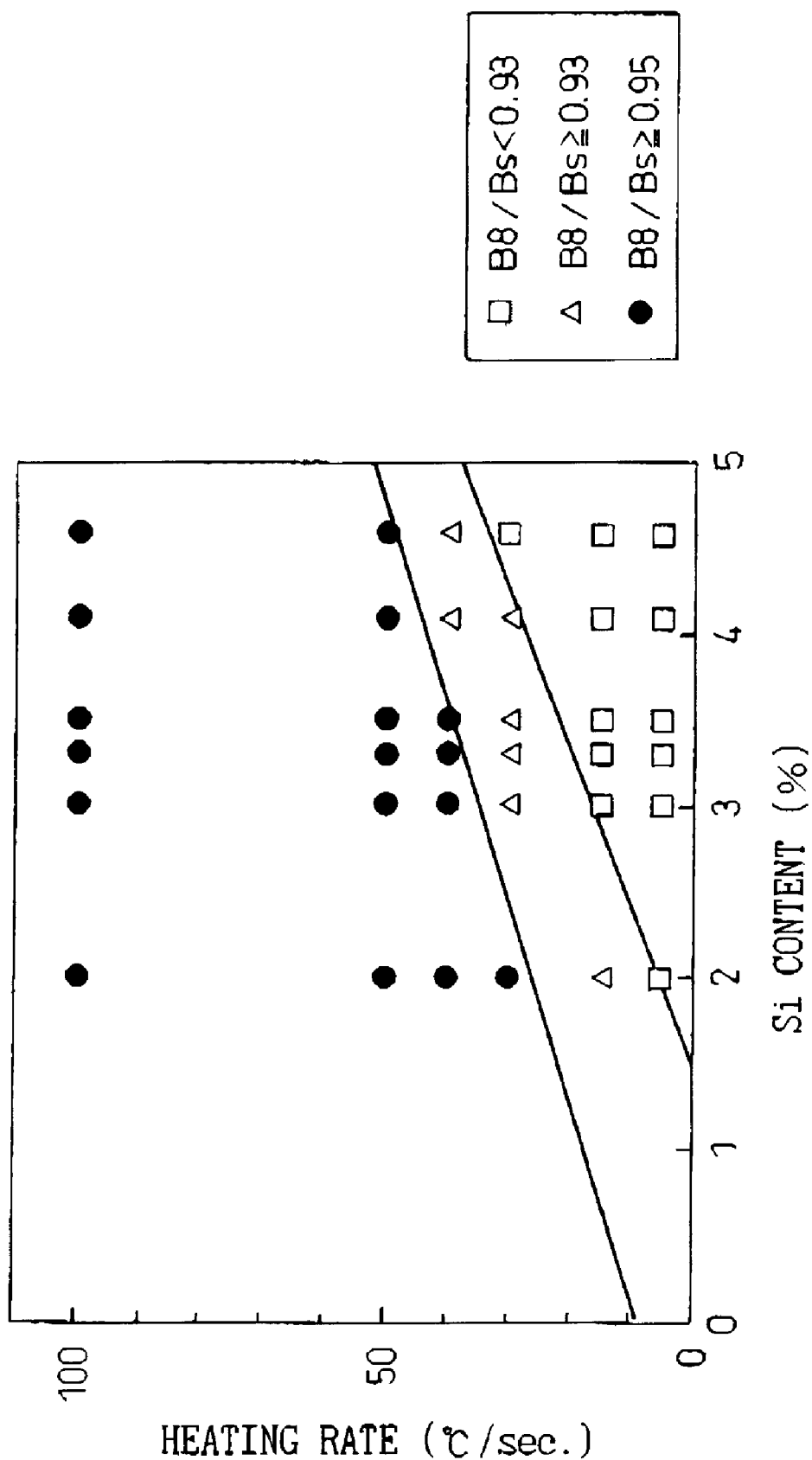

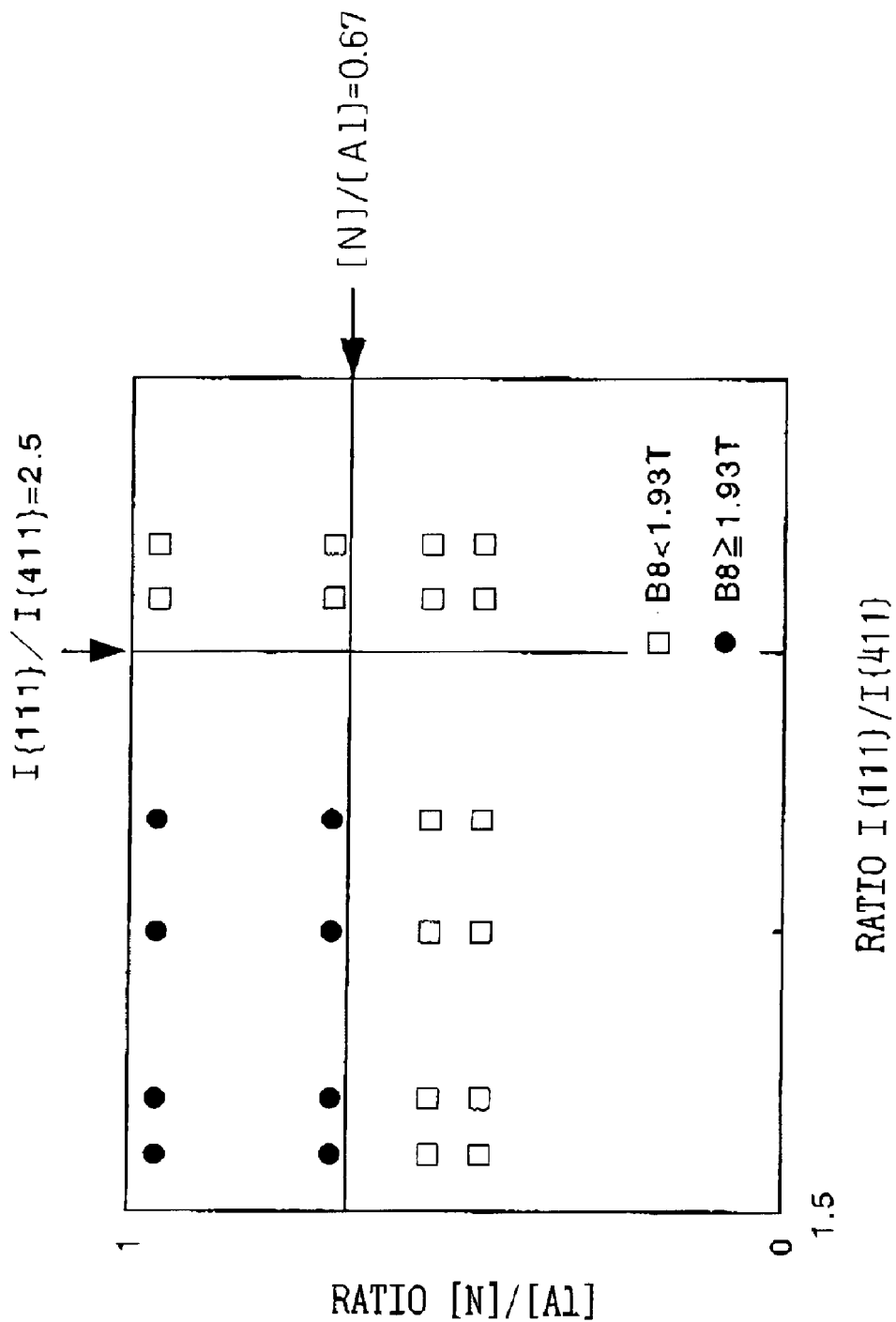

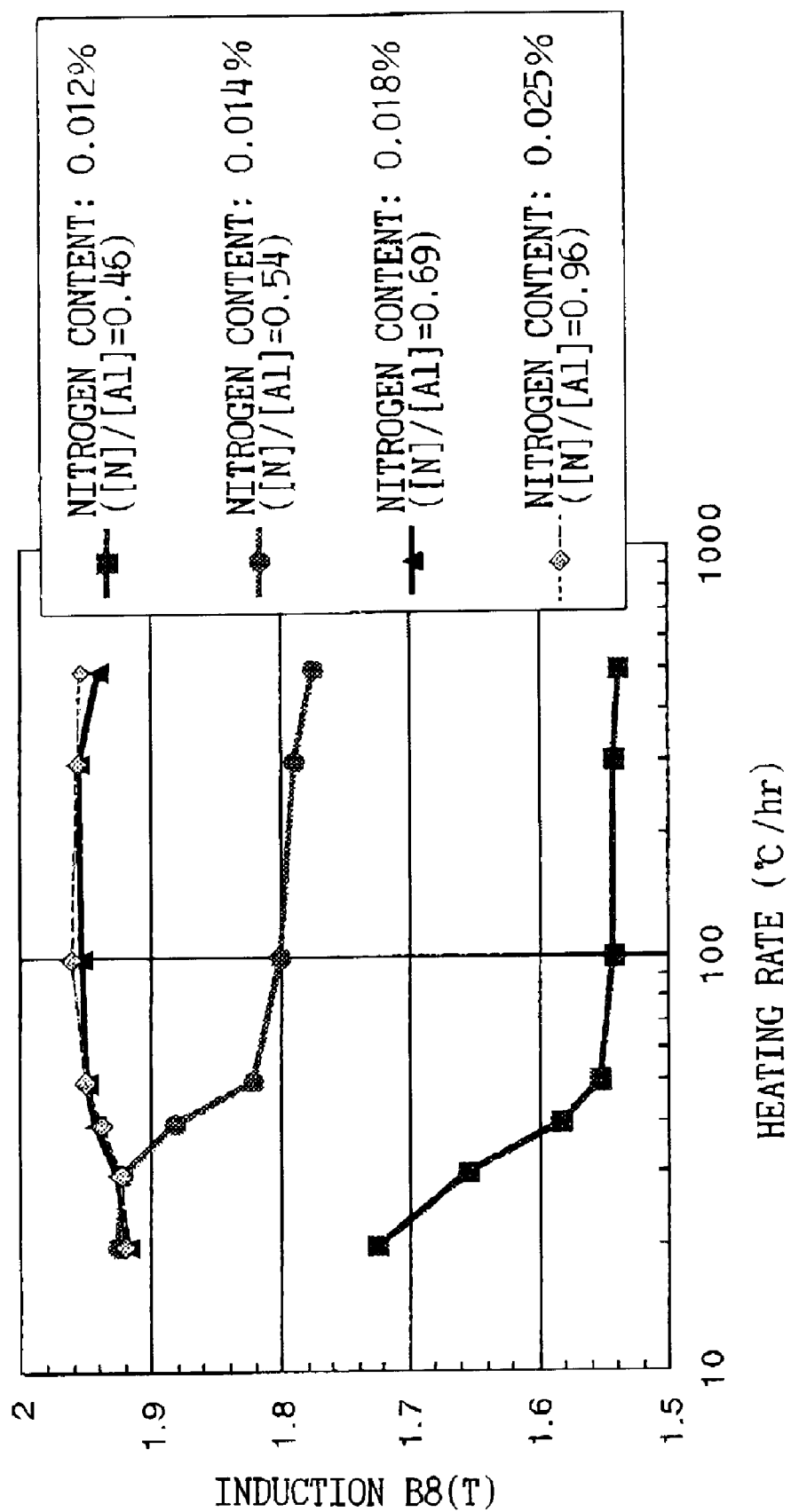

METHOD TO PRODUCE GRAIN-ORIENTED ELECTRICAL STEEL SHEET HAVING HIGH MAGNETIC FLUX DENSITY

BACKGROUND OF THE INVENTION

1. Field of the Invention

The present invention relates to a method to produce a grain-oriented electrical steel sheet having crystal grains whose orientations are aligned in the {110}<001> orientations in terms of the Miller index. The grain-oriented electrical steel sheet is used as a soft magnetic material for the cores of electrical equipment such as transformers.

2. Description of the Related Art

A grain-oriented electrical steel sheet is a steel sheet containing 4.8% or less of Si and consisting of crystal grains the orientations of which are aligned in the {110}<001> orientations (the so-called Goss orientations). The steel sheets are required to have good excitation performance and core loss performance with regard to their magnetic properties. The magnetic flux density B8 under the magnetic field intensity of 800 A/m is commonly used as an indicator of the excitation performance, and the core loss at W17/50 per 1 kg of a steel sheet when it is magnetized to 1.7 T at the frequency of 50 Hz is commonly used as an indicator of the core loss performance. The magnetic flux density B8 is the most significant factor governing the core loss property: the higher the value of the flux density B8, the better the core loss property becomes. In order to raise the flux density B8, it is important to properly align the crystal orientation. Control of the crystal orientation is achieved by taking advantage of a grain growth phenomenon called secondary recrystallization.

To control the secondary recrystallization, it is necessary to control the structure of the primary recrystallization prior to the secondary recrystallization and of fine precipitates called inhibitors. The inhibitors have a function to suppress the growth of ordinary crystal grains in the primary recrystallization structure and selectively allow the grains having the {110}<001> orientations to grow with priority.

As typical examples of the precipitates, MnS was proposed by M. F. Littmann (Japanese Examined Patent Publication No. S30-3651), J. E. May and D. Turnbull (Trans. Met. Soc. AIME 212 (1958) p769) and others; AlN by Taguchi et al. (Japanese Examined Patent Publication No S40-15644); and MnSe by Imanaka et al. (Japanese Examined Patent Publication No. S51-13469).

A normal practice is that these precipitates are completely dissolved as solid solutions during the slab heating prior to hot rolling and then precipitate as fine deposits during the processes of hot rolling and subsequent annealing. The slabs have to be heated to a temperature as high as 1,350 to 1,400° C., or even higher, in order to turn these precipitates into complete solid solutions. However, since this heating temperature is higher than that of plain carbon steel slabs by roughly 200° C., the following problems are brought about; 1) a specially designed reheating furnace is required; 2) the unit energy consumption of the reheating furnace is high; and 3) molten scale is formed in a great amount and deslagging, and other extra work for furnace maintenance, are necessary.

Facing these problems, research and development in search of a production method using low temperature slab heating were carried out. As a production method using the low temperature slab heating, Komatsu et al. proposed a method to form (Al, Si)N through a nitriding process and use it as an inhibitor.(see Japanese Examined Patent Publication No. S62-45285). Kobayashi et al. disclosed, as a method of the nitriding, a method to nitride the steel sheet in the form of an uncoiled strip after decarburization annealing (see Japanese unexamined Patent Publication No. H2-77525), and Ushigami et al, reported the behavior of the nitrides thus formed (Materials Science Forum, 204–206 (1996) pp593–598).

With regard to the production method of a grain-oriented electrical steel sheet by low temperature slab heating, the control of a primary recrystallization structure during decarburization annealing is important for controlling the secondary recrystallization, because no inhibitor is formed during the decarburization annealing. As far as the research into a production method of a grain-oriented electrical steel sheet by the conventional high temperature slab heating is concerned, few reports have been presented regarding the control of the primary recrystallization structure prior to the secondary recrystallization, and the inventors of the present invention disclosed its importance in Japanese Examined Patent Publication No. H8-32929, Japanese Unexamined Patent Publication No. H9-256051, etc.

They disclosed in Japanese Examined Patent Publication No. H8-32929 that, if the primary recrystallization grain structure became uneven with a variation coefficient of its grain size distribution larger than 0.6, the secondary recrystallization would become unstable. Then, as a result of studies of the primary recrystallization structure and the inhibitors, which are control parameters for secondary recrystallization, they made it clear in Japanese unexamined Patent Publication No. H9-256051, further, that the flux density of final products could be enhanced by controlling the ratio I{111}/I{411}, namely the ratio of the grains aligned in the {111} orientations to those aligned in the {411} orientations, of the primary recrystallization grain structure, which grains are considered to accelerate the growth of the Goss orientation grains in the texture after decarburization annealing (where, I means diffraction intensity). Here, I{111} and I{411} are the proportions of the grains with their {111} and {411} planes, respectively, aligned in parallel to the surface of the steel sheet, and they are measured in terms of the diffraction intensity values by the X-ray diffraction measurement at a plane $\frac{1}{10}$ of the sheet thickness from the surface.

The primary recrystallization structure after the decarburization annealing is influenced not only by annealing cycle factors of the decarburization annealing such as heating rate, soaking temperature, soaking time, etc., but also by process conditions prior to the decarburization annealing such as the application or otherwise of annealing to a hot-rolled steel sheet, the reduction ratio at cold rolling (cold reduction ratio), etc.

The primary recrystallization after the decarburization annealing can be controlled, for example, by properly changing the annealing cycle parameters of the decarburization annealing such as the heating rate, soaking temperature, soaking time, etc. Among these, the control of the heating rate is a significant measure to control the primary recrystallization. It was found out, however, that, although the flux density increased basically when the heating rate was raised, if it was raised to 40° C./sec. or higher, the secondary recrystallization might become unstable even when the primary recrystallization structure after the decarburization annealing was sound.

With respect to the influence of the cold reduction ratio over the primary recrystallization, it is necessary to set the reduction ratio at 80% or higher in order to have the crystal grains having the orientation aligned in the {111} and {411} orientations develop in the primary recrystallization structure, and this is very important for making the ratio of I{111}/I{411} equal to or less than 3, which ratio is an indicator in obtaining a high magnetic flux density.

It has been found out, however, that, although the flux density of final products was basically enhanced when the cold reduction ratio was raised, if it exceeded a certain limit, the secondary recrystallization became unstable and the flux density of the final products would be deteriorated even when the value of I{b 111}/I{411} was kept equal to or less than 3.

Besides the above measures to control the secondary recrystallization through the control of the primary recrystallization texture and the like, technologies to finely divide magnetic domains have been developed for the purpose of further lowering the core loss of a grain-oriented silicon steel sheet. In the case of a laminated core, a method to reduce the core loss by finely dividing magnetic domains through the irradiation of a laser beam to a steel sheet after finish annealing to create local micro-strains is disclosed, for example, in Japanese Examined Patent Publication No. S58-26405. In the case of a wound core, on the other hand, a method is disclosed, for example, in Japanese Unexamined Patent publication No. S62-86175, whereby the effect of the refining of the magnetic domains does not disappear even if stress relieving annealing is applied to the core after it is formed. The core loss has been remarkably reduced thanks to these technical measures to finely divide the magnetic domains.

The observations of the movements of magnetic domains have made it clear, however, that some of the magnetic domains remain unaffected by the above measures, and that, in order to further reduce the core loss value of a grain-oriented electric steel sheet, it was important, in addition to the refining of the magnetic domains, to cancel the pinning effect generated by the interface irregularities caused by a glass film on the steel sheet surface which hinders the movements of the magnetic domains.

To this end, it is effective not to allow the glass film hindering the movements of the magnetic domains to form on the steel sheet surface. As a measure to do so, U.S. Pat. No. 3,785,882, for example, discloses a method to prevent the glass film from forming by using coarse high purity alumina as an annealing separator. The proposed method, however, cannot eliminate inclusions immediately below the surface composed mainly of oxides and, consequently, the core loss improvement realized by the method is as small as 2% in terms of W15/60.

As a method to reduce the inclusions immediately below the surface and obtain a smooth surface (with an average surface roughness Ra equal to or less than 0.3 $\mu$m), Japanese Unexamined Patent Publication No. S64-83620, for example, discloses a method to apply a chemical or electrolytic polishing after finish annealing and removing the glass film. But, although the methods such as the chemical or electrolytic polishing are applicable to small laboratory scale samples, they involve significant problems in relation to the concentration control of chemicals, temperature control, and the provision of anti-pollution measures, etc. when applied in an industrial scale and, thus, they are not practically usable yet.

As a measure to solve some of the above problems, the present inventors disclosed that it was possible to reduce the inclusions immediately below the surface and obtain a smooth surface after finish annealing by controlling the dew point at decarburization annealing, not allowing Fe oxides ($Fe_2SiO_4$, FeO, etc.) to form in the oxide layer created during the decarburization annealing, and using a substance such as alumina which does not react with silica as the annealing separator (see Japanese Unexamined Patent Publication No. H7-118750).

SUMMARY OF THE INVENTION

The present invention, established as a result of clarifying the causes of the instability of the secondary recrystallization, provides a method to stably produce a grain-oriented electrical steel sheet, excellent in magnetic properties and having a high magnetic flux density, on an industrial scale.

The present invention also discloses a method to produce a grain-oriented electrical steel sheet excellent in magnetic properties having a high magnetic flux density, by controlling the primary recrystallization of a grain-oriented electrical steel sheet having a very smooth surface.

The present invention discloses, further, a method to stably produce a grain-oriented electrical steel sheet excellent in magnetic properties having a high magnetic flux density in an industrial scale, by avoiding the instability of the secondary recrystallization through appropriately controlling the conditions of the decarburization annealing.

The gist of the present invention, which has been accomplished for the purpose of solving the problems delineated above, is as follows:

(1) A method to produce a grain-oriented electrical steel sheet having a high magnetic flux density by heating a silicon steel, comprising, in mass %, 0.8 to 4.8% of Si,
0.85% or less of C,
0.01 to 0.065% of Sol. Al, and
0.012% or less of N, with the balance consisting of Fe and unavoidable impurities, to a heating temperature of 1,280° C. or below, hot-rolling it into a steel sheet, cold-rolling the steel sheet in one cold rolling step or two or more cold rolling steps with an intermediate annealing in between to a final thickness, annealing it for decarburization, applying an annealing separator composed mainly of magnesia, and then conducting finish annealing, in this sequential order, characterized by; controlling the ratio I{111}/I{411} in the texture after the decarburization annealing so as not to exceed 3.0; controlling the oxygen content of an oxygen layer of the steel sheet so as not to exceed 2.3 $g/m^2$; and then nitriding the steel sheet.

(2) A method to produce a grain-oriented electrical steel sheet having a high magnetic flux density by heating a silicon steel, comprising, in mass %, 0.8 to 4.8% of Si,
0.085% or less of C,
0.01 to 0.065% of Sol. Al, and
0.012% or less of N, with the balance consisting of Fe and unavoidable impurities, to a heating temperature of 1,280° C. or below, hot-rolling it into a steel sheet, cold-rolling the steel sheet in one cold rolling step or two or more cold rolling steps with an intermediate annealing in between to a final thickness, annealing it for decarburization, applying an annealing separator composed mainly of magnesia, and then conducting finish annealing, in this sequential order, characterized by: controlling the ratio I{111}/I{411} in the texture after the decarburization annealing so as not to exceed (10ln {(100−

R)/100}+44)/7, where R is the reduction ratio (%) of the cold rolling; controlling the oxygen content of an oxygen layer of the steel sheet so as not to exceed 2.3 g/m$^2$; and then nitriding the steel sheet.

(3) A method to produce a grain-oriented electrical steel sheet having a high magnetic flux density according to item (1) or (2), characterized by heating the steel sheet, in the heating process of the decarburization annealing, at a heating rate H° C./sec. satisfying the expression $10^{[(R-68)/14]}<H$ from a temperature of 600° C. or below to a prescribed temperature in the range from 750 to 900° C.

(4) A method to produce a grain-oriented electrical steel sheet having a high magnetic flux density according to item (1) or (2), characterized by heating the steel sheet, in the heating process of the decarburization annealing, at a heating rate H° C./sec. satisfying the expression $10^{[(R-32)/32]}<H<140$ from a temperature of 600° C. or below to a prescribed temperature in the range from 750 to 900° C.

(5) A method to produce a grain-oriented electrical steel sheet having a high magnetic flux density according to item (1) or (2), characterized by heating the steel sheet, in the heating process of the decarburization annealing, at a heating rate H° C./sec. satisfying the expression $10^{[(R-68)/14]}<H$ from a temperature of 600° C. or below to a prescribed temperature in the range from 750 to 900° C., and then, under an oxidizing index (PH$_2$O/PH$_2$) of the annealing atmosphere gas exceeding 0.15 but not exceeding 1.1 through the temperature range from 770 to 900° C.

(6) A method to produce a grain-oriented electrical steel sheet having a high magnetic flux density according to item (1) or (2), characterized by heating the steel sheet, in the heating process of the decarburization annealing, under a condition to satisfy the expression H° C./sec$\geq$10×[Si%]−15, where [Si%] is the Si content of the steel sheet and H is the heating rate.

(7) A method to produce a grain-oriented electrical steel sheet having a high magnetic flux density according to the item (1) or (2), characterized by applying the nitriding treatment so that the content of N [N] may satisfy the expression [N]/[Al]$\geq$0.67 in relation to the content of acid-soluble Al [Al] of the steel sheet after the nitriding process.

(8) A method to produce a grain-oriented electrical steel sheet having a high magnetic flux density according to item (1) or (2), characterized in that the silicon steel further contains one or both of 0.02 to 0.15% of Sn and 0.03 to 0.2% of Cr, in mass %.

(9) A method to produce a grain-oriented electrical steel sheet having a high magnetic flux density by heating a silicon steel, comprising, in mass %,
0.8 to 4.8% of Si,
0.085% or less of C,
0.01 to 0.065% of Sol. Al, and
0.012% or less of N,
with the balance consisting of Fe and unavoidable impurities, to a heating temperature of 1,280° C. or below, hot-rolling it into a steel sheet, cold-rolling the steel sheet, in one cold rolling step or two or more cold rolling steps with intermediate annealing in between, to a final thickness, annealing it for decarburization, applying an annealing separator composed mainly of alumina, and then conducting finish annealing, in this sequential order, characterized by: heating the steel sheet, in a heating process of the decarburization annealing, at a heating rate of 40° C./sec. or more from a temperature of 600° C. or below to a prescribed temperature in the range from 750 to 900° C., then under an oxidizing index (PH$_2$O/PH$_2$) of the annealing atmosphere gas controlled in the range of 0.01 or more and 0.15 or less so as not to form Fe oxides through the temperature range from 770 to 900° C.; controlling the ratio I{111}/I{411} in the texture after the decarburization annealing so as not to exceed 2.5; then applying nitriding treatment so that the content of N [N] may satisfy the expression [N]/[Al]$\geq$0.67 in relation to the content of acid-soluble Al [Al] of the steel sheet after the nitriding process.

(10) A method to produce a grain-oriented electrical steel sheet having a high magnetic flux density according to item (9), characterized by controlling the ratio I{111}/I{411} in the texture after the decarburization annealing so as not to exceed (20ln {(100−R)/100}+81)/14, where R is the reduction ratio (%) of the cold rolling.

(11) A method to produce a grain-oriented electrical steel sheet having a high magnetic flux density according to item (9) or (10), characterized by heating the steel sheet, in a heating process of the decarburization annealing, at a heating rate H° C./sec. satisfying the expression $10^{[(R-68)/14]}<H$ from a temperature of 600° C. or below to a prescribed temperature in the range from 750 to 900° C.

(12) A method to produce a grain-oriented electrical steel sheet having a high magnetic flux density according to item (9) or (10), characterized by heating the steel sheet, in a heating process of the decarburization annealing, at a heating rate H° C./sec. satisfying the expression $10^{[(R-32)/32]}<H<140$ from a temperature of 600° C. or below to a prescribed temperature in the range from 750 to 900° C.

(13) A method to produce a grain-oriented electrical steel sheet having a high magnetic flux density according to item (9), characterized in that the silicon steel further contains one or both of 0.02 to 0.15% of Sn and 0.03 to 0.2% of Cr, in mass %.

BRIEF DESCRIPTION OF THE DRAWINGS

FIG. 1 is a graph showing the influence of the ratio I{111}/I{411} of the texture and the oxygen amount of the decarburization-annealed steel sheet on the magnetic flux density (B8) of final products.

FIG. 2 is a graph showing the influence of the heating rate during the decarburization annealing on the magnetic flux density (B8) of final products.

FIG. 3 is a graph showing the influence of the heating rate and the oxidizing index of the atmosphere gas during the decarburization annealing on the oxygen content of the steel sheet after the decarburization annealing.

FIG. 4 is a graph showing the influence of the nitrogen content (and the ratio [N]/[acid-soluble Al]) on the magnetic flux density (B8).

FIG. 5 is a graph showing the influence of the end point temperature of the heating at the heating rate of 40° C./sec. of the decarburization annealing on the magnetic flux density.

FIG. 6 is a graph showing the influence of the starting temperature of the heating at the heating rate of 40° C./sec. of the decarburization annealing on the magnetic flux density.

FIG. 10 is a graph showing the influence of the Si content and the heating rate of the decarburization annealing on the magnetic flux density (B8) of final products.

FIG. 11 are graphs showing the influence of the primary recrystallization texture (the ratio I{111}/I{411}) after the decarburization annealing and the inhibitor (the ratio [N]/[Al]) on the magnetic flux density (B8) of final products with a smooth surface.

FIG. 12 is a graph showing the relation between the heating rate of the decarburization annealing and the nitrogen content after the nitriding treatment and their influence on the magnetic flux density (B8) of final products with a smooth surface.

DESCRIPTION OF THE PREFERRED EMBODIMENTS

Figure 7A:
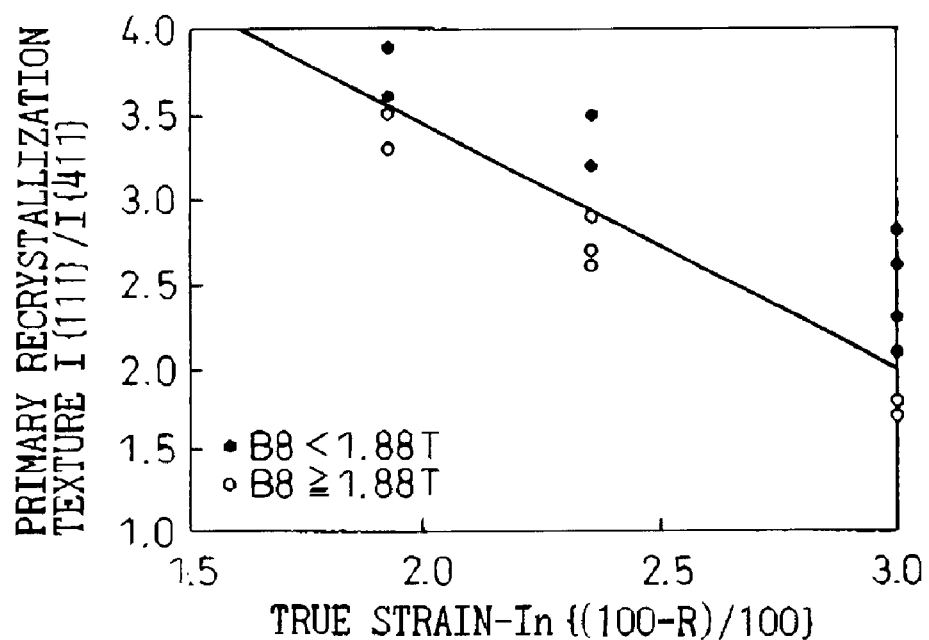
FIG. 7(a) represents the case with a glass film covering the steel sheet surface and FIG. 7(b) the case with a smooth surface.

The present inventors studied in detail the reasons why the secondary recrystallization became unstable when the heating rate of the decarburization annealing was raised to 40° C./sec. or more, even if the primary recrystallization structure after the decarburization annealing was sound. As a result, it became clear, in the first place, that, when the heating rate was raised, the amount of surface oxidation of the steel sheet after the decarburization annealing increased, despite the fact that the furnace resident time, the sum of the heating time and the soaking time, was shorter. Examinations of the influence of the surface oxide layer on the secondary recrystallization revealed that, when surface oxides were formed in great quantities, the (Al, Si)N inhibitor rapidly decomposed in the secondary recrystallization temperature range during the finish annealing, making the secondary recrystallization unstable. The reason why the decomposition of the (Al, Si)N inhibitor was accelerated when the surface oxides were formed in large quantities was, presumably, that the surface oxide layer accelerated the denitrification of the inhibitor or the oxidation of Al in it. Since it became clear that the secondary recrystallization was made unstable by the influence not of the primary recrystallization structure but of the inhibitor, the present inventors looked for a method to solve the problem. As a result, they discovered that it was possible to stably produce a grain-oriented electrical steel sheet having a high magnetic flux density by suppressing the decomposition of the (Al, Si)N inhibitor through controlling the oxidizing index of the atmosphere gas at the soaking zone of a decarburization annealing furnace, and the soaking time, so as to limit the oxygen content in the surface oxide layer to 2.3 g/m² or less, in addition to controlling the primary recrystallization grain structure.

The present invention is explained in detail hereafter based on test results.

FIG. 1 is a graph showing the influence of the primary recrystallization texture (I{111}/I{411}) and the oxygen content on the magnetic flux density (B8) of final products. Here, silicon steel slabs, comprising 3.1% of Si, 0.05% of C, 0.027% of acid-soluble Al, 0.008% of N, 0.1% of Mn and 0.007% of S, with the balance consisting of Fe and unavoidable impurities, were heated to 1,100° C. and hot-rolled into steel sheets 2.0 mm in thickness. The hot-rolled steel sheets were then annealed at 1,100° C., cold-rolled to the final thickness of 0.2 mm, then heated to 850° C. at different heating rates ranging from 5 to 600° C./sec., and then cooled to room temperature. After that, the steel sheets were heated to 830° C. at the heating rate of 30° C./sec., annealed for 2 min. at 830° C. and for 90 sec. in furnace atmosphere gases having oxidizing indexes ($PH_2O/PH_2$) of 0.33 to 0.70, and then annealed again at 750° C. for 30 sec. in an atmosphere containing ammonia to regulate the nitrogen content of the steel sheets to 0.02%. Then, an annealing separator, mainly composed of MgO, was applied to the sheets and they underwent finish annealing at 1,200° C. for 20 hr.

As a result, it turned out that, as shown in FIG. 2, when the heating rate of the decarburization annealing was 40° C./sec. or higher, there were cases that the secondary recrystallization became unstable and that the magnetic flux density decreased despite the fact that the primary recrystallization texture had been controlled within an appropriate range. Research into the causes of the above phenomenon yielded confirmation to the effect that the oxidation amount of the steel sheets increased after the decarburization annealing and that, with the great amount of oxides formed on the surface, the (Al, Si)N inhibitor rapidly decomposed in the secondary recrystallization temperature range during the final annealing, rendering the secondary recrystallization unstable.

The content of oxygen after the decarburization annealing (in the case of a soaking temperature of 840° C.) is shown in FIG. 3. It can be understood from the figure that, when the heating rate is increased, the oxygen content increases in spite of the shorter residence time in the furnace. This is presumably because the initial oxidation condition of the steel sheets during the heating process is changed by the heating rate, and this influences the oxidation behavior during the soaking process thereafter. As a result of investigations of the change behavior of the inhibitor during the finish annealing of these samples, it was confirmed that the higher the oxygen content, the more quickly the inhibitor decreased during the finish annealing. Then, the results shown in FIG. 2 were analyzed for the purpose of clarifying the influence of the primary recrystallization texture (the ratio I{111}/I{411}) and the oxygen content. It was made clear by the analysis that, as shown in FIG. 1, when the oxygen content of the steel sheets was 2.3 g/m² or less, the secondary recrystallization structure developed stably, making it possible to stably produce grain-oriented electrical steel sheet products having a value of the ratio I{111}/I{411}, an indicator of the primary recrystallization texture, equal to or less than 3 and a value of the magnetic flux density B8 of 1.88 T or higher, Since the stabilization of the secondary recrystallization was achieved thanks, presumably, to the suppression of the decomposition of (Al, Si)N, the present inventors, further, investigated the influence of the nitrogen increment over the secondary recrystallization by changing the amount of nitrogen increment at the nitriding treatment after the decarburization annealing for the purpose of controlling the (Al, Si)N inhibitor.

The above-mentioned cold-rolled steel sheets were heated to 840° C. at the heating rate of 50° C./sec., and decarburization-annealed at the temperature for 120 sec. in a mixed atmosphere of nitrogen and hydrogen having an oxidizing index of 0.37. The oxygen content of the steel sheets was 1.8 g/m². Thereafter, they were annealed for nitriding in a furnace atmosphere containing ammonia to raise the nitrogen content to 0.012 to 0.030% by changing the ammonia content. Following this, they were finish-annealed after applying an annealing separator mainly composed of MgO. It can be confirmed from FIG. 4 that the secondary recrystallization becomes stable and the magnetic flux density increases when the nitrogen content is equal to or larger than 0.018%, namely when the expression [N]/[Al] ≧0.67 is satisfied. It is clear, therefore, that it is necessary to control the nitrogen content [N] and aluminum content [Al] so that the expression [N]/[Al]≧0.67 is satisfied in order to form stable (Al, Si)N.

Technologies to control the heating rate of the decarburization annealing in the production of the grain-oriented electrical steel sheet have been disclosed, for example, in Japanese Unexamined Patent Publication Nos. H1-290716, H6-212262, etc. In these technologies, however, the control of the heating rate of the decarburization annealing is applied to the production of a grain-oriented electrical steel sheet by the high temperature slab heating and its effects are limited to the reduction of the grain size at the secondary recrystallization and an improvement in the core loss.

Different from the above, the effect of the present invention on the final products is that the magnetic flux density (B8) is largely improved. The present inventors consider the mechanism of the magnetic flux density improvement to be as follows. The growth of the secondary recrystallization grains is determined by the balance between the energy density at the grain boundary of matrix grains acting as a driving force for the grain growth and the inhibitor restraining it. It has been known that, when the heating rate of the decarburization annealing is increased, generally speaking, the crystal grains having orientations close to the Goss orientations (which grains will be the nuclei of the secondary recrystallization grains) are increased in the primary recrystallization structure. This has been considered to be the reason why the secondary recrystallization structure is made fine. In the present invention, however, when a thermally stable (strong) inhibitor, e.g. nitrides such as (Al, Si)N, etc. formed through a nitriding treatment, is used, grain boundary movement tends to be more dependent on the nature of the boundary and, as a consequence, the control of the matrix grains having a coincidence orientation relationship to the Goss orientations such as {111} orientation grains, {411} orientation grains, etc., which make the Goss orientation grains grow with preference, become more important than the number of the Goss orientation grains. The present inventors investigated the primary recrystallization texture from the above viewpoint and confirmed that, when comparing the samples heated at the heating rate of 20° C./sec. and those at 100° C./sec., for example, the density distribution of matrix grains having a coincidence orientation relationship to the Goss orientation in the samples heated at 100° C./sec., which heating rate makes the flux density higher, was more acuter than the same of the samples heated at 20° C./sec., and that the value of the ratio I{111}/I{411} became smaller in this case. It is suspected, as a consequence, that the acute Goss orientations could be selectively developed only by the synergistic effects of the control of the primary recrystallization texture through the control of the heating rate of the decarburization annealing, especially that of the grains having coincidence orientation relationship to the Goss orientations and the strong (Al, Si)N inhibitor, and that this made viable the stable production of the grain-oriented electrical steel sheet products having a high magnetic flux density.

The present invention stipulates that the silicon steel has to contain 0.8 to 4.8% of Si, 0.085% or less of C, 0.01 to 0.065% of acid-soluble Al, and 0.012% or less of N.

When the addition amount of Si is increased, electric resistance of steel increases and the core loss property improves. When added in excess of 4.8%, however, the steel becomes prone to cracking during rolling. When its content is below 0.8%, on the other hand, γ transformation takes place during the finish annealing, damaging crystal orientation.

C is effective for controlling the primary recrystallization structure but, since it is detrimental to the magnetic properties, decarburization is necessary before the finish annealing. When the content of C is larger than 0.085%, the decarburization annealing takes a long time and productivity is lowered.

Acid-soluble Al is indispensable in the present invention, because it reacts with N to act as the inhibitor in the form of (Al, Si)N. For this reason, its content has to be in the range from 0.01 to 0.065%, where the secondary recrystallization is stabilized.

When the content of N exceeds 0.012%, voids called blisters form in the steel sheets during cold rolling. Hence, its content is limited to 0.012% or less.

Sn is effective for improving the texture of {111}, {411}, etc. after the decarburization annealing, making it possible to stably produce products having a high magnetic flux density. It is preferable to add 0.02 to 0.15% of Sn as stated hereinafter in Example 5. Below this lower limit, the texture improvement effect is too small and no significant improvement of the flux density is obtained. Above the upper limit, in contrast, the nitriding of the steel sheet becomes difficult and the secondary recrystallization may become unstable.

As for elements other than the above, S is harmful to the magnetic properties and thus it is preferable to limit its content to not exceed 0.015%. Cr is effective for improving the oxide layer formed during the decarburization annealing and for forming the glass film, and it is preferable to add it by 0.03 to 0.2%. Note that the effects of the present invention are not lost if the steel contains small amounts of Cu, Sb, Mo, Bi, Ti, etc.

The silicon steel slabs having the chemical gal composition specified above are manufactured by melting the steel in a converter or an electric arc furnace, subjecting the steel to a vacuum degassing process as required and then performing continuous casting or ingot casting and breakdown rolling. After that, the slabs are heated prior to hot rolling. In the present invention, the slab heating temperature is set at 1,280° C. or lower to avoid the problems related to the high temperature slab heating.

The slabs heated to the above temperature are then hot-rolled into steel sheets of prescribed thickness.

The hot-rolled steel sheets are annealed, as a normal practice, for a short period of 30 sec. to 30 min at 900 to 1,200° C. for the purpose of enhancing the magnetic properties. It is preferable to decide whether or not to apply the short time annealing in consideration of required characteristics of the product and production costs. The steel sheets are subsequently cold-rolled into a final thickness in one rolling step or two or more rolling steps with intermediate annealing in between. A final cold reduction ratio of 80% or more is required for obtaining well-developed primary recrystallization orientations of {111}, {411}, etc.

In order to remove C in the steel, the cold-rolled steel sheets are annealed for decarburization in a humid atmosphere. It is possible to stably produce products having a magnetic property (B8) of 1.88 T or higher by controlling, during the decarburization, the ratio I{111}/I{411} of the grain structure after the decarburization annealing so that its value may be equal to or less than 3 and the oxygen content in the oxide layer of the steel sheets so that it may be 2.3 g/m$^2$ or lower and, then, nitriding the steel sheets before the secondary recrystallization takes place. The primary recrystallization after the decarburization annealing can be controlled, for example, by properly setting the conditions of the decarburization annealing cycle such as the heating rate, soaking temperature, soaking time, etc. In this process it is necessary, besides controlling the primary recrystallization texture, to control the oxidizing index (PH$_2$O/PH$_2$) of the furnace atmosphere gas and the annealing time so that the oxygen content of the steel sheets may be 2.3 g/m$^2$ or lower.

The heating rate at the decarburization annealing is a significant controlling factor of the primary recrystallization texture ({111}, {411}). The temperature range through which it is necessary to heat the steel sheets at a specified heating rate is at least from 600° C. to a temperature from 750 to 900° C.

FIGS. 5 and 6 show the test results from which the above conclusion was derived. In the tests, the cold-rolled steel sheets were heated from the room temperature to a prescribed temperature in the range from 600 to 1,000° C. at the heating rate of 40° C./sec. and then cooled to room temperature with nitrogen gas. After that, they were heated to 850° C. at the heating rate of 20° C./sec. and annealed for 120 sec. in an atmosphere gas having the oxidizing index of 0.33. Then, their nitrogen content was regulated to 0.021% through nitriding, and the steel sheets underwent finish annealing after the application of an annealing separator composed mainly of MgO. It is seen in FIG. 5 that, if the heating rate of 40° C./sec. is maintained until the temperature range from 750 to 900° C. is reached, the magnetic flux density increases remarkably. If the temperature thus reached is below 750° C., a good effect is not obtained presumably because the primary recrystallization is not completed at a temperature below 750° C. and it is necessary to have the recrystallization completed in order to realize a desired primary recrystallization texture. On the other hand, if the heating rate of 40° C./sec. is maintained until the temperature exceeds 900° C., a good result is not obtained presumably because a transformation structure forms locally in the samples and the structure obtained at the end of the decarburization annealing thereafter becomes a mixed grain structure.

Subsequently, the cold-rolled steel sheets were heated at the heating rate of 20° C./sec. to a prescribed temperature in the temperature range from 300 to 750° C., then, from the prescribed temperature to 850° C. at the heating rate of 40° C./sec. and, after that, cooled to the room temperature with nitrogen gas. After that, they were heated to 850° C. at the heating rate of 20° C./sec. for annealing for 120 sec. in an atmosphere gas having the oxidizing index of 0.33. Then, their nitrogen content was regulated to 0.021% through nitriding, and the steel sheets underwent finish annealing after the application of an annealing separator composed mainly of MgO. It is clear from FIG. 6 that, when the heating at the heating rate of 40° C./sec. is commenced at a temperature above 600° C., no flux density enhancing effect appears.

From these results, it is understood that the temperature range which influences the magnetic property (B8) through the control of the primary recrystallization texture by controlling the heating rate is at least from 600° C. to a temperature from 750 to 900° C.

The heating rate has a significant influence over the primary recrystallization texture I{111}/I{411}. In order to control the value of I{111}/I{411} to equal to or less than 3 and stably produce the products having a magnetic flux density B8 of 1.88 T or higher, it is necessary to set the heating rate at 15° C./sec. or higher. If the heating rate is 40° C./sec. or higher, as explained in detail hereinbefore, the conditions of the decarburization annealing have to be so regulated as to control the oxidation amount during the decarburization annealing process, in addition to the control of the texture. A preferable range of the heating rate for realizing the best possible magnetic flux density is, as described hereinafter in Example 4, 75 to 125° C./sec.

The present invention does not specify the method to control the heating rate of the decarburization annealing: a modification of a conventional decarburization annealing apparatus having radiant tubes or the like utilizing normal radiation heating is effective for realizing a heating rate of 40 to 100° C./sec. or so; a method using new high-energy heat sources such as a laser, a plasma and the like, and a method to use an induction heating apparatus, an electric resistance heating apparatus or the like are effective for a heating rate of 100° C./sec. or above. It is also possible to appropriately combine the conventional decarburization annealing apparatus having radiant tubes or the like utilizing normal radiation heating with the method using new high energy heat sources such as laser, plasma and the like, the method to use an induction heating apparatus, an electric resistance heating apparatus or the like, etc.

The soaking temperature is set in view of the control of the primary recrystallization grain structure as explained, for example, in Japanese Unexamined Patent Publication Nos. H2-182866 and H9-256051. A normal soaking temperature is from 770 to 900° C. It is also effective to decarburize in the first half of the soaking process and then raise the temperature in the second half for controlling the grains. If the oxidizing index of the atmosphere gas is below 0.15, the adhesion of the glass film formed on the steel sheet surface is deteriorated; if it exceeds 1.1, the glass film will have defects. When the heating rate during the heating stage is raised, oxidation during the soaking is accelerated. In order to control the oxygen content within a prescribed range, therefore, it is necessary to control the oxidizing index of the atmosphere gas or the soaking time.

Methods for the nitriding include a method to anneal a steel sheet in an atmosphere comprising nitriding gas such as ammonia, another to nitride the steel sheet during the finish annealing by adding nitriding powder such as MnN to the annealing separator, and other methods. In order that the secondary recrystallization takes place stably under a high heating rate of the decarburization annealing, it is necessary to control the composition of (Al, Si)N so that the nitrogen content after the nitriding treatment may satisfy the expression [N]/[Al]≧0.67, in mass, in relation to the amount of Al in the steel.

Next, the relation between the cold reduction ratio and the primary recrystallization structure is explained based on the test results.

FIGS. 7(a) and (b) are graphs showing the relation between the magnetic flux density B8 of the products after the secondary recrystallization annealing and the ratio I{111}/I{411} of the primary recrystallization texture after the decarburization annealing (at the surface layer: the layer at $\frac{1}{10}$ the thickness) plotted in relation to the true strain $\ln\{100/(100-R)\}$ calculated from the cold reduction ratio R (%); FIG. 7(a) represents the case of using an annealing separator mainly composed of MgO and FIG. 7(b) the case of using another mainly composed of $Al_2O_3$ at the finish annealing.

The samples used in the case of FIG. 7(a) were prepared as follows: slabs containing, in mass, 3.2% of Si, 0.05% of C, 0.026% of acid-soluble Al, 0.008% of N, 0.1% of Mn and 0.007% of S were heated to 1,150° C. and hot-rolled into steel sheets 1.5, 2.3 and 4.4 mm in thickness; after that, the steel sheets were annealed at 1,120° C., then cold-rolled to the thickness of 0.22 mm, and decarburization-annealed at the heating rate of 15° C./sec. at a temperature of 770 to 950° C.; and then some samples, right after that, and the others, after adjusting their nitrogen contents to 0.020 to 0.03%, through annealing in an atmosphere containing ammonia, were finally finish-annealed after applying an annealing separator mainly composed of MgO. The samples used in the case of FIG. 7(b) were prepared as follows: slabs containing, in mass, 3.2% of Si, 0.05% of C, 0.026% of acid-soluble Al, 0.008% of N, 0.1% of Mn and 0.007% of S were heated to 1,150° C. and hot-rolled into steel sheets 1.5, 2.3 and 2.8 mm in thickness; after that, the steel sheets were annealed at 1,120° C., then cold-rolled to the thickness of 0.22 mm, and decarburization-annealed at the heating rate of 50° C./sec. at a temperature of 770 to 950° C.; and then some samples, right after that, and the others, after adjusting their nitrogen contents to 0.020 to 0.03% through annealing in an atmosphere containing ammonia, were finally finish-annealed after applying an annealing separator mainly composed of $Al_2O_3$.

The plotting shows the samples having stably undergone the secondary recrystallization, and does not include those which demonstrated low values of B8 as a result of their variation coefficient of the primary recrystallization grain structure having surpassed 0.6 as described in the Japanese Unexamined Patent Publication No. H2-182866.

As is clear in FIGS. 7(a) and (b), there is a close correlation between the value of I{111}/I{411} after the decarburization annealing and the magnetic flux density B8, and the threshold value of I{111}/I{411} to obtain a high magnetic flux density changes in relation to the cold reduction ratio. It is also clear that, in the case of using an annealing separator mainly composed of MgO at the finish annealing, the threshold of the range of I{111}/I{411} to obtain the magnetic flux density B8 of 1.88 T or higher has a linear relation to the true strain $\ln\{(100-R)/100\}$ and the range covers $(10\ln\{(100-R)/100\}+44/7$ and below. On the other hand, in the case of using an annealing separator mainly composed of $Al_2O_3$ at the finish annealing, the range of {111}/I{411} to obtain the magnetic flux density B8 of 1.93 T or higher is $(20\ln\{(100-R)/100\}+81/14$ and below to the true strain $-\ln\{(100-R)/100\}$.

The reason why the above results appear is not altogether clear, but the present inventors suspect as follows: in the primary recrystallization texture, while the {111} orientation grains and {411} orientation grains, which accelerate the growth of the {110}<001> secondary recrystallization grains, develop as the cold reduction ratio increases in the range of 80% or higher, the {110} orientation grains including the {110}<001> orientation grains decrease at the same time.

When an inhibitor as thermally stable (strong) as nitride such as (Al, Si)N, etc. is used, as in the present invention, grain boundary movement tends to be more dependent on the nature of the boundary and, as a consequence, the number and crystal orientation deviation of the matrix grains having Σ9 coincidence orientation relationship to the Goss orientations (specifically, {111}<112> and {411}<148>) become more important than the number of the Goss orientation grains. It has to be noted that the {111} and {411} orientation grains accelerate the growth of [110]<001> orientation grains in the primary recrystallization structure, which grains will become the secondary recrystallization grains. For this reason, the sufficient volume of the {111} and {411} orientation grains is necessary, and the volume especially of the {411} orientation grains having small crystal orientation deviation is important.

The present inventors investigated the influence of inhibitor intensity, which constituted a prerequisite to bring about the effect to enhance the value of B8, by changing the nitrogen content after nitriding treatment within a range from 0.01 to 0.03%. Here, FIG. 8 shows the result in case of using $Al_2O_3$ as an annealing separator.

Figure 7B:
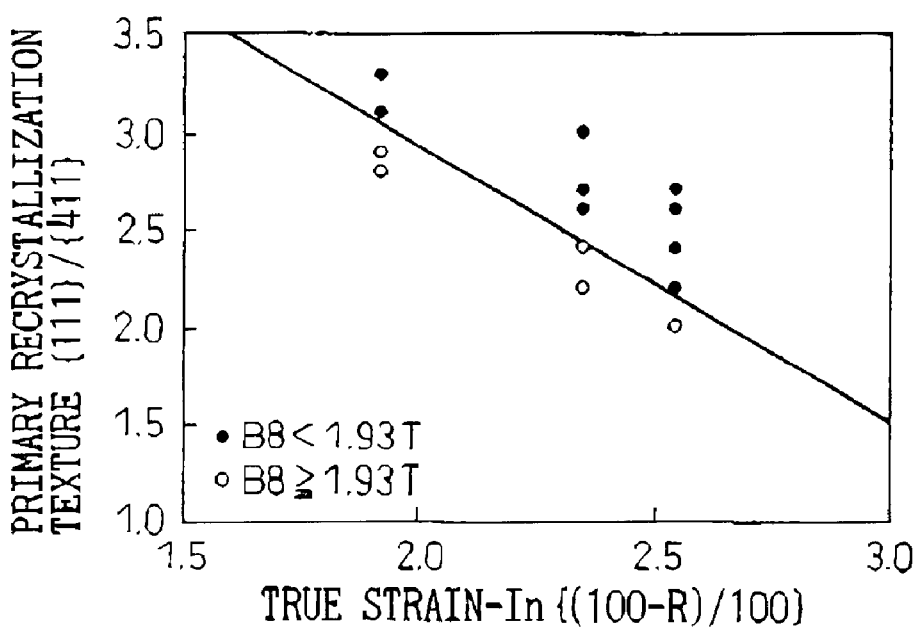
FIG. 7 are graphs showing the influence of the cold reduction ratio and the ratio I{111}/I{411} of the primary recrystallization texture on the magnetic flux density (B8) of final products.
Figure 8:
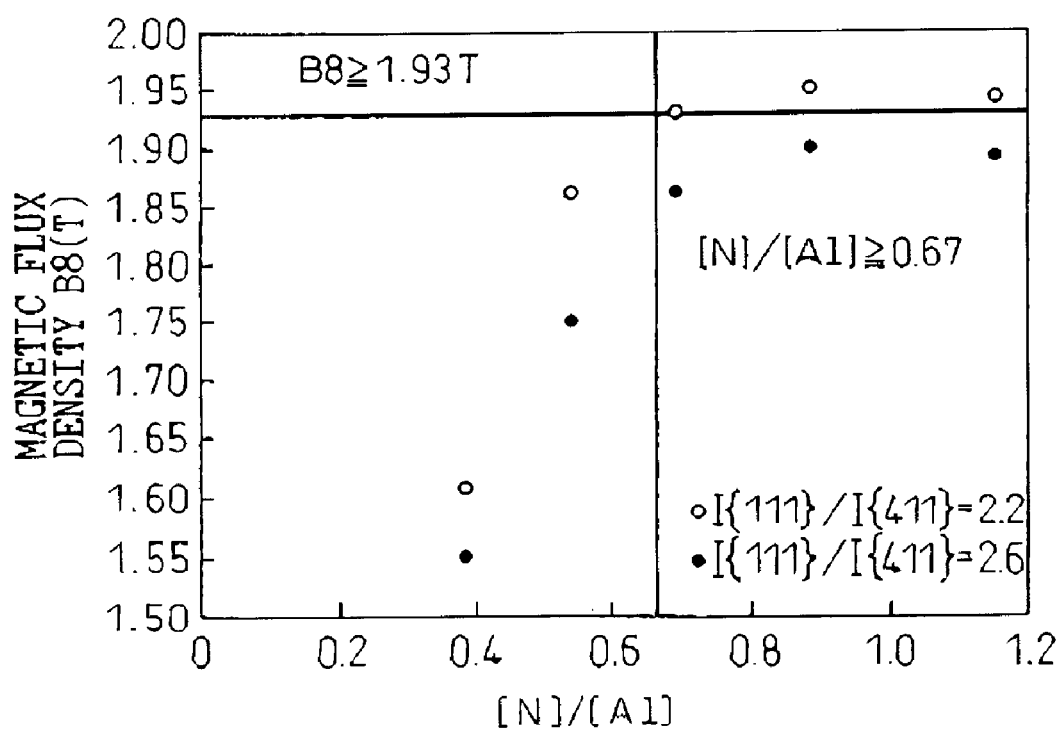
FIG. 8 is a graph showing the influence of the nitriding amount and the ratio I{111}/I{411} of the primary recrystallization texture on the magnetic flux density of final products with a smooth surface.

FIG. 8 shows the values of B8 of the samples prepared by nitriding, from among those used in the above test shown in FIG. 7(b), the steel sheets cold-rolled at a reduction ratio of 90.4% from 2.3-mm thick hot-rolled sheets and decarburization-annealed, having the values of I{111}/I{411} of 2.2 and 2.6, in relation to [N]/[Al], which is the ratio of the nitrogen amount [N] (%) after the nitriding to the amount of acid-soluble Al [Al] (%) in the steel sheets. It can be understood from FIG. 8 that the value of B8 is 1.93 T or larger when the two requirements, the expression [N]/[Al] ≧0.67 being satisfied and the threshold value of I{111}/I{411} corresponding to the cold reduction ratio of 90.4% being 2.43 or smaller, are fulfilled. Further, the same results as described above are substantially obtained even when MgO is used as an annealing separator.

Figure 9A:
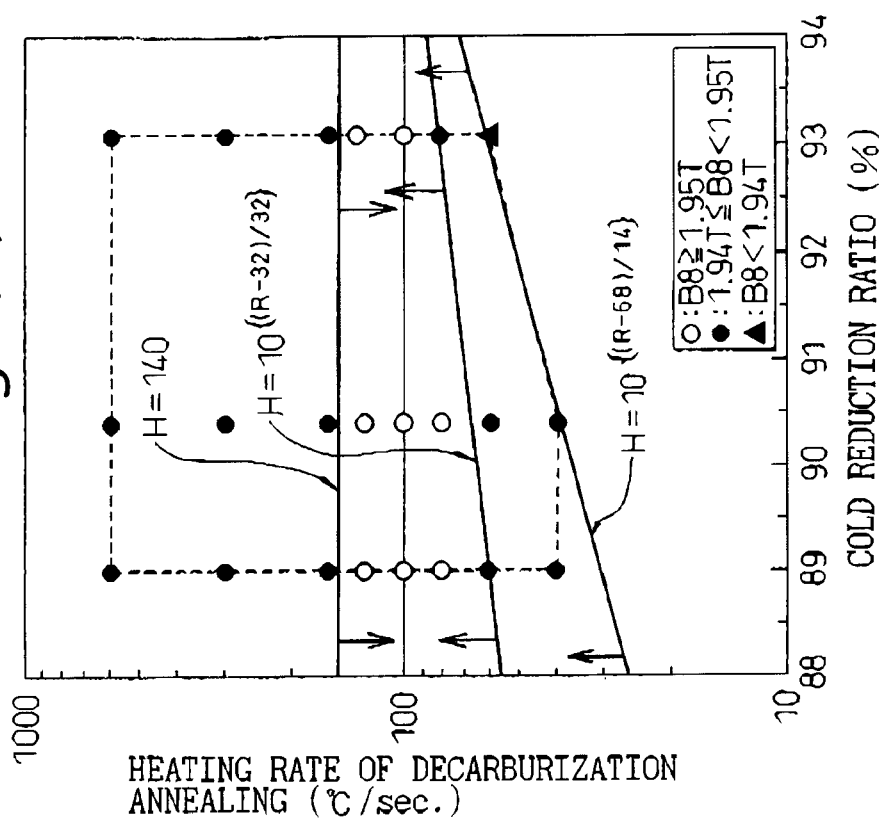
FIG. 9(a) represents the case with a glass film covering the steel sheet surface and FIG. 9(b) the case with a smooth surface.

On the basis of the above result, the present inventors attempted to identify the conditions to further raise the value of B8 by changing the value of I{111}/I{411} through controlling the heating rate of the decarburization annealing and the cold reduction ratio. FIGS. 9(a) and (b) are graphs in which the magnetic flux density B8 (T) of the products is plotted in relation to the cold reduction ratio and the heating rate of the decarburization annealing.

The samples used in FIG. 9(a) were prepared as follows: slabs containing, in mass, 3.3% of Si, 0.05% of C, 0.027% of acid-soluble Al, 0.007% of N, 0.1% of Cr, 0.05% of Sn, 0.1% of Mn and 0.008% of S were heated to 1,150° C., hot-rolled into steel sheets 2.0, 2.3 and 3.2 mm in thickness; the steel sheets were annealed at 1,120° C. and cold-rolled to the thickness of 0.22 mm; then the cold-rolled sheets were heated to 800° C. at heating rates ranging from 20 to 600° C./sec., decarburization-annealed at 800 to 890° C. for 120 sec. in an atmosphere having the oxidizing index of 0.44 to control the primary recrystallization texture so as to fall within the zone shown in FIG. 1 to obtain a high value of B8, annealed at 750° C. for 30 sec. in a furnace atmosphere containing ammonia, and finally, finish-annealed at 1,200° C. for 20 hr. after applying an annealing separator mainly composed of magnesia. The samples used in FIG. 9(b) were prepared as follows; the cold-rolled sheets 0.22 mm in thickness produced in the above experiment were heated to 800° C. at heating rates ranging from 40 to 600° C./sec., decarburization-annealed at 800 to 890° C. for 120 sec. in an atmosphere having the oxidizing index of 0.12 to control the primary recrystallization texture so as to fall within the zone shown in FIG. 1 to obtain a high value of B8, annealed at 750° C. for 30 sec. in a furnace atmosphere containing ammonia to regulate their nitrogen content to 0.02 to 0.03% by changing the ammonia content of the atmosphere, and finally, finish-annealed at 1,200° C. for 20 hr. after applying an annealing separator mainly composed of alumina.

Figure 9B:
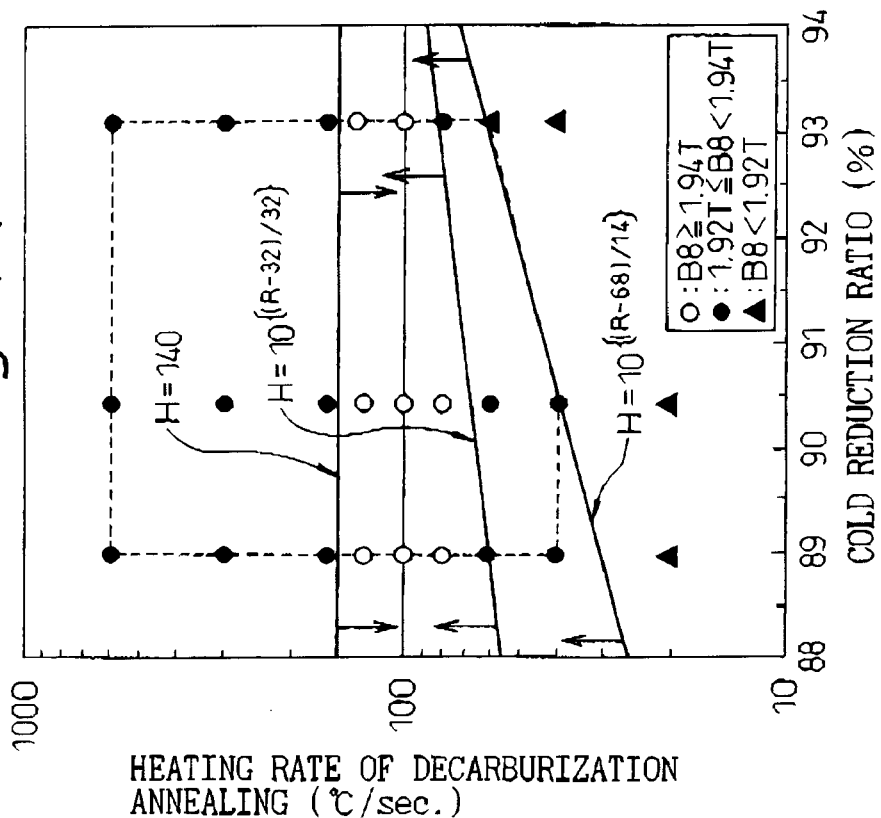
FIG. 9 are graphs showing the influence of the cold reduction ratio and the heating rate of the decarburization annealing on the magnetic flux density.

It is clear from FIGS. 9(a) and 9(b) that the boundary between the high B8 and low B8 zones can be expressed in terms of a linear relation between the logarithm of the heating rate H of the decarburization annealing and the cold reduction ratio. It is understood from this that the lower limit of the heating rate of the decarburization annealing to obtain a high value of B8 goes up as the cold reduction ratio increases.

It can be understood from the same figures that, in order to set the lower limit of the heating rate so as to secure a high value range of B8 (the high value range means 1.92 T or more in case of using MgO as an anti-sticking agent and 1.94 T or more in case of using $Al_2O_3$ as an annealing separator), it is enough to determine the heating rate H° C./sec. of the decarburization annealing so as to satisfy the expression $10^{[(R-68)/14]} < H$ in relation to the cold reduction ratio R%. This means that the value of the heating rate of the decarburization annealing required for obtaining a high value of B8 can be determined in relation to each cold reduction ratio. A high value of B8 can be obtained, therefore, by setting the heating rate of the decarburization annealing H° C./sec. so as to satisfy the expression $10^{[(R-68)/14]} < H$ for each cold reduction ratio R%. In particular, when the range of the heating rate H° C./sec. of the decarburization annealing is restricted as defined by the expression $10^{[(R-32)/32]} < H < 140$ using the cold reduction ration R%, the highest values of B8 can be obtained.

Since the range of the cold reduction ratio to obtain high B8 values broadens as the heating rate becomes higher in the present invention, it is particularly preferable to set the final cold reduction ratio at 85% or higher. But, if the cold reduction ratio exceeds 95%, the load to the cold rolling process becomes too heavy, and a cold reduction ratio of 95% or less is realistic from the operational viewpoint.

The steel sheets after being cold rolled are decarburization-annealed in a humid atmosphere for the purpose of removing C in the steels. In this process, in case of using MgO as an annealing separator at the finish annealing, it is important to control the value of $I\{111\}/I\{411\}$ to $(10\ln\{(100-R)/100\}+44)/7$ or less. By this, products having a magnetic property B8 of 1.88 T or larger can be produced. On the other hand, in case of using $Al_2O_3$ as an, annealing separator, it is important to control the value of $I\{111\}/I\{411\}$ to $(20\ln\{(100-R)/100\}+81)/14$ or less. By this, products having a magnetic property B8 of 1.93 T, or larger can be produced. The primary recrystallization structure after the decarburization annealing can be controlled by properly regulating the annealing cycle (heating rate, soaking temperature, soaking time, etc.) of the decarburization annealing.

By heating the steel sheets in the decarburization annealing at a heating rate H° C./sec. satisfying the expression $10^{[(R-68)/14]} < H$ in order to control especially the value of $I\{111\}/I\{411\}$ to $(20\ln\{(100-R)/100\}+81)/14$ or less, a yet higher value of B8 can be obtained. The temperature range in which this heating rate has to be applied is at least from 600° C. to a temperature from 750 to 900° C.

Figure 13:
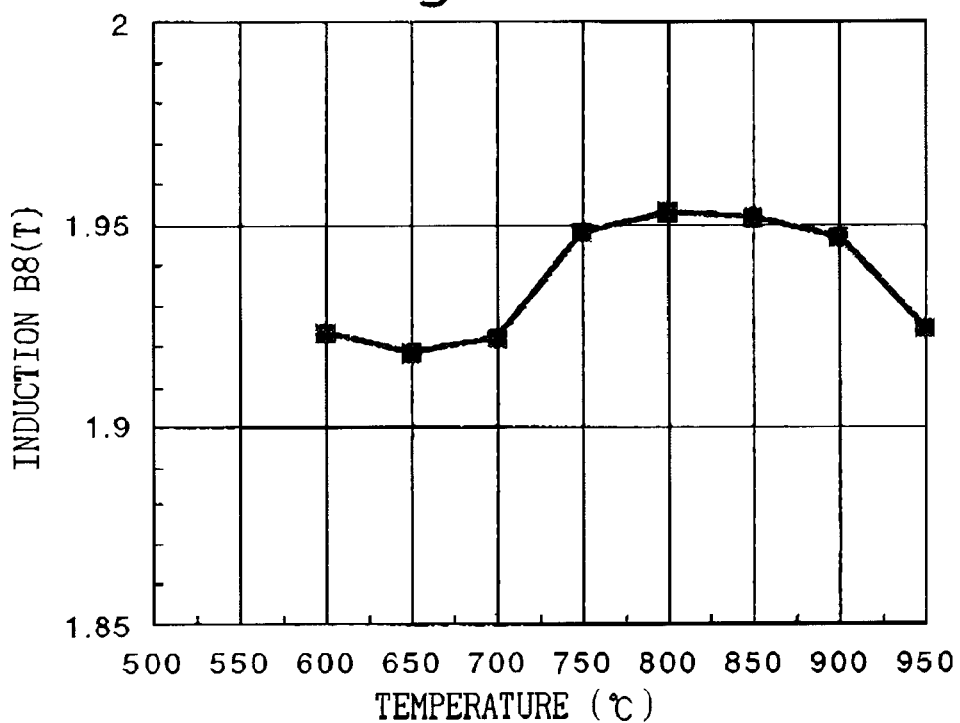
FIG. 13 is a graph showing the influence of the end point temperature of rapid heating during the decarburization annealing on the magnetic flux density of final products with a smooth surface.

The cold-rolled steel sheets were heated from the room temperature to a prescribed temperature in the range from 600 to 1,000° C. at the heating rate of 50° C./sec. and then cooled back to the room temperature with nitrogen gas. After that, they were heated to 850° C. at the heating rate of 20° C./sec. and annealed for 120 sec. in an atmosphere gas having the oxidizing index of 0.10. Then, their nitrogen content was adjusted to 0.021% through nitriding treatment, and the steel sheets underwent finish annealing after the application of an annealing separator composed mainly of alumina. It can be seen from FIG. 13 that the magnetic flux density increases when the heating rate of 50° C./sec. is maintained until a temperature in the range from 750 to 900° C. is reached. The reason why a good effect is not obtained when the heating rate is kept only up to a temperature below 750° C. is that the primary recrystallization does not advance sufficiently below 750° C. It is necessary to have the recrystallization fully advanced in order to change the primary recrystallization texture. If the heating rate is kept until the temperature exceeds 900° C., in contrast, the magnetic flux density is lowered, presumably because a transformation structure forms locally in a sample, and the structure at the end of the decarburization annealing thereafter becomes a mixed grain structure.

Figure 14:
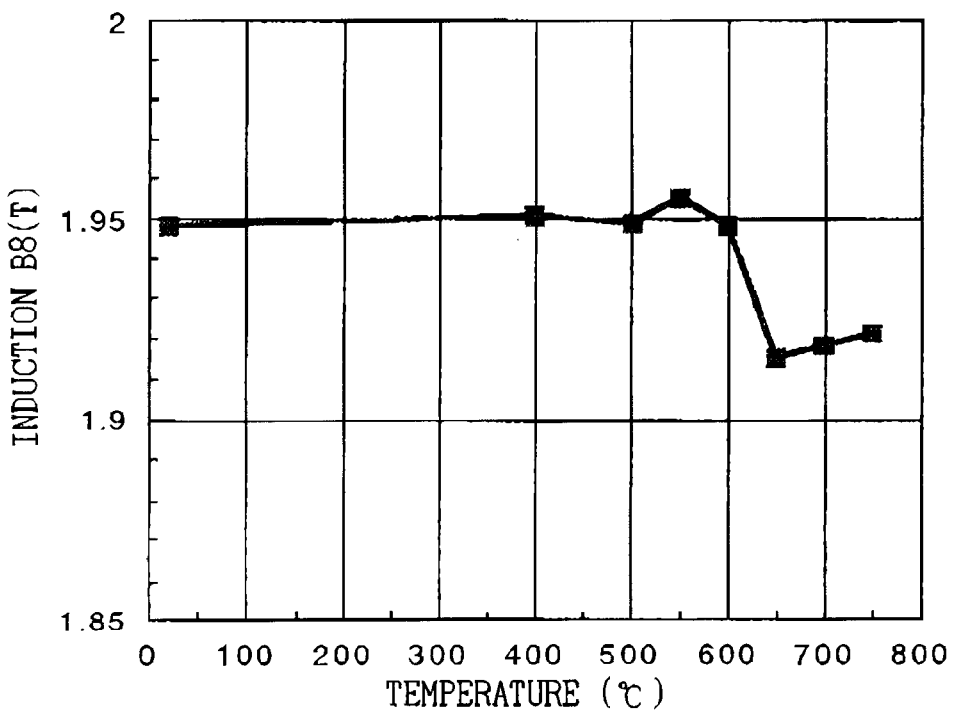
FIG. 14 is a graph showing the influence of the starting temperature of rapid heating during the decarburization annealing over the magnetic flux density of final product with a smooth surface.

Subsequently, the above cold-rolled steel sheets were heated to a prescribed temperature in the range from 300 to 750° C. at the heating rate of 20° C./sec. and from the prescribed temperature to 850° C. at the heating rate of 50° C./sec., and then cooled to the room temperature with nitrogen gas. After that, they were heated again to 850° C. at the heating rate of 50° C./sec. and annealed for 120 sec. in an atmosphere gas having the oxidizing index of 0.10. Then, their nitrogen content was adjusted to 0.021% by nitriding treatment, and the steel sheets underwent finish annealing after the application of an annealing separator composed mainly of alumina. It can be seen from FIG. 14 that no effect to increase the magnetic flux density is obtained when the starting temperature at the heating rate of 50° C./sec is a temperature above 600° C.

From these results, it is understood that the temperature range which influences the magnetic property (B8) through the control of the primary recrystallization texture by controlling the heating rate is at least from 600° C. to a temperature from 750 to 900° C. If the steel sheets are heated as specified above during the heating process of the decarburization annealing, the effects of the present invention are not adversely affected even if any heating/annealing is applied between the cold rolling and the decarburization annealing.

After that, the steel sheets are annealed under an oxidizing index of the furnace atmosphere not to form Fe oxides ($Fe_2SiO_4$, FeO, etc.). At a temperature around 800° C. where the decarburization annealing is usually conducted, for instancer the formation of the Fe oxides can be suppressed by making the oxidizing index $PH_2O/PH_2$ of the furnace atmosphere gas equal to 0.15 or lower. If the oxidizing index is lowered excessively, however, the rate of the decarburization is lowered. As a trade-off of these factors, it is preferable to control the oxidizing index $PH_2O/PH_2$ of the furnace atmosphere gas within a range from 0.01 to 0.15 in this temperature range.

Next, FIG. 11 shows the influence of the primary recrystallization texture (the ratio $I\{111\}/I\{411\}$) after the decarburization annealing and the inhibitor (the ratio [N]/[Al]) on the magnetic flux density B8 of the products. Here, slabs containing, in mass, 3.2% of Si, 0.05% of C, 0.026% of acid-soluble Al, 0.07% of N, 0.1% of Mn and 0.007% of S were heated to 1,150° C. and hot-rolled into steel sheets 2.3 mm in thickness. The hot-rolled steel sheets were then annealed at 1,120° C., cold rolled to the thickness of 0.22 mm, then heated to 800° C. at different heating rates ranging from 10 to 500° C./sec. After that, the steel sheets were decarburization-annealed at 840° C. for 120 sec. in a mixed atmosphere of nitrogen and hydrogen having the oxidizing index of 0.1, then annealed again in an atmosphere containing ammonia to adjust their nitrogen content to 0.012 to 0.025%. Then, the sheets underwent finish annealing after applying an annealing separator mainly composed of alumina.

FIG. 12 shows the result of analysing the above findings from the viewpoint of the influence of the primary recrystallization texture (the ratio I{111}/I{411}) and the inhibitor (the ratio [N]/[Al]). It can be understood from the figure that the products having high magnetic flux density can be stably produced by controlling the ratio I{111}/I{411} equal to or less than 2.5 in the grain structure after the decarburization annealing and then, prior to the occurrence of the secondary recrystallization, nitriding the steel sheets so that their nitrogen content [N] (%) may satisfy the expression [N]/[Al]≧0.67 in relation to the content of acid-soluble Al [Al] (%) in the steel sheets. The enhancement effect of the magnetic flux density is presumably a result of the synergistic effects of the control of the primary recrystallization structure by the rapid heating at the decarburization annealing combined with the control of the (Al, Si)N inhibitor by the nitriding after the decarburization annealing.

The cold-rolled steel sheets are decarburization-annealed in a humid atmosphere to remove C in the steel. Products having high magnetic flux density can be stably produced by controlling the ratio I{111}/I{411} during the above process so that it does not exceed 2.5 in the grain structure after the decarburization annealing and then, prior to the occurrence of the secondary recrystallization, nitriding the steel sheets so that their nitrogen content [N] (%) may satisfy the expression [N]/[Al]≧0.67 in relation to the content of acid-soluble Al [Al] (%) of the steel sheets. The primary recrystallization texture after the decarburization annealing is controlled by properly regulating the control parameters of the decarburization annealing such as the heating rate, soaking temperature, soaking time, etc. Among these control parameters, the control of the primary recrystallization texture, especially by paying attention to the heating rate, is one of the key points of the present invention.

As a result of studies, from widely varied viewpoints, into the crystal orientation control of the secondary recrystallization under different contents of Si, the present inventors discovered that it was necessary to change the heating rate of the decarburization annealing in relation to the Si content.

This point is explained below in detail based on test results.

FIG. 10 shows the relation of the magnetic property to the Si content and the heating rate of the decarburization annealing. Here, silicon steel slabs, comprising 2.0 to 4.8% of Si, 0.055% of C, 0.030% of acid-soluble Al, 0.008% of N, 0.1% of Mn and 0.007% of S, with the balance consisting of Fe and unavoidable impurities, were heated to 1,150° C. and hot-rolled into steel sheets 2.0 mm in thickness.

The hot-rolled steel sheets were annealed by holding at 1,120° C. for 30 sec. and then at 900° C. for 30 sec. and rapidly cooling thereafter, and subsequently cold-rolled into the final thickness of 0.2 mm. Then the cold-rolled sheets were heated to 850° C. at different heating rates ranging from 5 to 100° C./sec., and then cooled to the room temperature.

After that, the steel sheets were heated at the heating rate of 30° C./sec. to 830° C., annealed at the temperature for 2 min. and then in a furnace atmosphere having the oxidizing index ($PH_2O/PH_2$) of 0.33 for 90 sec., and annealed again at 750° C. for 30 sec. in an atmosphere containing ammonia, to raise the nitrogen content to 0.02%. Then, an anti-sticking agent for annealing mainly composed of MgO was applied to the steel sheets and they were heated to 1,200° C. at the heating rate of 15° C./sec. in the furnace atmosphere consisting of 25% of $N_2$ and 75% of $H_2$ and then, changing the furnace atmosphere to 100% $H_2$, finish-annealed at 1,200° C. for 20 hr.

As is clear from FIG. 10, by controlling the heating rate H (° C./sec.) of the decarburization annealing and the Si content [Si] (%) of the steel sheets, good magnetic properties satisfying the expressions $B8/B_8 \geq 0.93$ and $B8/B_S \geq 0.95$ were obtained when the conditions of the expressions (1) and (2) below, respectively, were satisfied. Here, $B_S$ is a saturation magnetic flux density. The ratio $B8/B_8$ was used in the evaluation for the degree of integration of the {110}<001> orientations, since the saturation magnetic flux density changes depending on the content of Si.

$$H(° C./sec.) \geq 10 \times [Si](\%) - 15 \quad (1)$$

$$H(° C./sec.) \geq 8 \times [Si](\%) + 10 \quad (2)$$

The present inventors deduce that the mechanism to enhance the magnetic property is as follows. For the purpose of selective growth of the {110}<001> orientation grains into the secondary recrystallization grains in the material of the present invention, the control of the texture of the matrix such as {111}<112> and {411}<148> having coincidence relationship to the {110}<001> orientations is important. When the Si content of the steel increases, the volume percentages of the α and γ phases change during the hot rolling process and the annealing process thereafter, which changes the crystal structure of the steel sheets before cold rolling different.

As an influence on the crystal structure, the texture of the matrix such as the {111}<112> and {411}<148> orientation grains in the primary recrystallization structure makes the grains having the orientations deviated from the {110}<001> orientations easily form in the secondary recrystallization. As a result, it is suspected, the degree of convergence of the secondary recrystallization orientations to the {110}<001> orientations is lowered and so is the magnetic flux density (B8). This phenomenon is caused by the influence of the Si content over the primary recrystallization, and the higher the Si content, the more conspicuous it becomes. This is presumably the reason why it is effective to raise the heating rate at the decarburization annealing in relation to the increase of the Si content and control the texture of the primary recrystallization matrix such as {111}<112> and {411}<148>.

EXAMPLE

Example 1

Silicon steel slabs, containing, in mass, 3.2% of Si, 0.05% of C, 0.024% of acid-soluble Al, 0.007% of N, 0.1% of Cr, 0.05% of Sn, 0.1% of Mn and 0.008% of S, were heated to 1,150° C. and hot-rolled into steel sheets 2.3 mm in thickness. The hot-rolled steel sheets were then annealed at 1,120° C., cold-rolled to the thickness of 0.22 mm, heated then to 800° C. at the heating rate of 100° C./sec., and then annealed for decarburization at 820° C. for 90 to 600 sec. in an atmosphere having the oxidizing index of 0.52, then annealed again at 750° C. for 30 sec. in an atmosphere containing ammonia to raise the nitrogen content to 0.025%. Then, an annealing separator mainly composed of MgO was applied to the sheets and they underwent finish annealing at 1,200° C. for 20 hr. Table 1 shows the property figures of the samples thus prepared. It is seen therein that, when the oxygen content of the steel sheets is as high as 2.41 g/m$^2$, the magnetic property is deteriorated.

TABLE 1

| Soaking time (sec.) | Texture (I{111}/I{411}) | Oxygen content (g/m$^2$) | Magnetic flux density B8 (T) | Remark |
|---|---|---|---|---|
| 90 | 2.5 | 1.98 | 1.94 | Inventive example |
| 150 | 2.5 | 2.13 | 1.93 | Inventive example |
| 300 | 2.6 | 2.28 | 1.92 | Inventive example |
| 600 | 2.7 | 2.41 | 1.81 | Comparative example |

Example 2

Silicon steel slabs, containing, in mass, 3.2% of Si, 0.05% of C, 0.024% of acid-soluble Al, 0.007% of N, 0.1% of Cr, 0.05% of Sn, 0.1% of Mn and 0.008% of S, were heated to 1,150° C. and hot-rolled into steel sheets 2.3 mm in thickness. The hot-rolled steel sheets were then annealed at 1,120° C., cold-rolled to the thickness of 0.22 mm, then heated to 800° C. at the heating rate of 100° C./sec., and then annealed for decarburization at 820° C. for 110 sec. in an atmosphere having the oxidizing index of 0.44. The texture of the steel sheets (the ratio I{111}/I{411}) was 1.7, and their oxygen content was 1.9 g/m$^2$. Then, the sheets were annealed again at 750° C. for 30 sec. in a furnace atmosphere containing ammonia to control their nitrogen content to 0.012 to 0.026% by changing the ammonia content of the atmosphere. Then, an annealing separator mainly composed of magnesia was applied to the sheets and they underwent finish annealing at 1,200° C. for 20 hr. Table 2 shows the property figures of the samples thus prepared. It is understood therein that, when the nitrogen content of the steel sheet is 0.017% or more ([N]/[Al]>0.67), the magnetic flux density becomes high.

TABLE 2

| Nitrogen content % | [N]/[Al] | Magnetic flux density B8 (T) | Remark |
|---|---|---|---|
| 0.012 | 0.50 | 1.85 | Comparative example |
| 0.017 | 0.71 | 1.93 | Inventive example |
| 0.022 | 0.92 | 1.95 | Inventive example |
| 0.026 | 1.08 | 1.94 | Inventive example |

Example 3

Hot-rolled silicon steel sheets of 2.3 mm in thickness, containing, in mass, 3.1% of Si, 0.1% of Mn, 0.05% of C, 0.008% of S, 0.029% of acid-soluble Al, 0.008% of N, and 0.1% of Sn, were cold-rolled to the final thickness of 0.25 mm. Then, the cold-rolled sheets were heated to 840° C. in a mixed gas atmosphere of nitrogen and hydrogen having the oxidizing index of 0.33 at the heating rates of (1) 20° C./sec. and (2) 100° C./sec., and then annealed at 840° C. for 150 sec. for primary recrystallization. Then, the sheets were annealed again at 750° C. for 30 sec. in a furnace atmosphere containing ammonia to raise their nitrogen content to 0.023%. Then, an annealing separator mainly composed of magnesia was applied to the sheets and they underwent finish annealing, wherein the steel sheets were heated to 1,200° C. at the heating rate of 15° C./sec. in the furnace atmosphere composed of 25% of $N_2$ and 75% of $H_2$, and then, after changing the atmosphere to 100% $H_2$, annealed at 1,200° C. for 20 hr. The samples thus prepared underwent a tension coating processing. Table 3 shows the magnetic properties of the samples thus obtained. The effect of the present invention to improve the magnetic flux density can be confirmed therein, although these samples have lower magnetic flux densities than the samples of Examples 1 and 2, because the samples of this Example 3 were not annealed prior to the cold rolling.

TABLE 3

| Heating condition of decarburization annealing (° C./sec.) | Texture (I{111}/I{411}) | Oxygen content (g/m$^2$) | Magnetic flux density B8 (T) | Remark |
|---|---|---|---|---|
| (1) 20 | 3.2 | 1.63 | 1.874 | Comparative example |
| (2) 100 | 2.5 | 1.82 | 1.909 | Inventive example |

Example 4

Silicon steel slabs, containing, in mass, 3.3% of Si, 0.05% of C, 0.027% of acid-soluble Al, 0.007% of N, 0.1% of Cr, 0.05% of Sn, 0.1% of Mn and 0.008% of S, were heated to 1,150° C. and hot-rolled into steel sheets 2.3 mm in thickness. The hot-rolled steel sheets were then annealed at 1,120° C., cold-rolled to the thickness of 0.22 mm, then heated to 820° C. at heating rates ranging from 3 to 200° C./sec., and then annealed for decarburization at 820° C. for 110 sec. in an atmosphere having the oxidizing index of 0.44. The oxygen contents of the steel sheets ranged from 1.9 to 2.1 g/m$^2$. The steel sheets were then annealed again at 750° C. for 30 sec. in a furnace atmosphere containing ammonia to regulate their nitrogen content to 0.023 to 0.029% by changing the ammonia content in the atmosphere. Then, an annealing separator mainly composed of magnesia was applied to the sheets and they underwent finish annealing at 1,200° C. for 20 hr. Then a tension coating were applied to the samples thus prepared. Table 4 shows the magnetic properties of the samples thus obtained. It is clear from the table that the magnetic flux density (B8) is enhanced when the heating rate is 40° C./sec. or higher, more preferably when it is in the range of 75 to 125° C./sec.

TABLE 4

| Heating condition of decarburization annealing (° C./sec.) | Texture (I{111}/I{411}) | Magnetic flux density B8 (T) | Remark |
|---|---|---|---|
| 3 | 4.5 | 1.85 | Comparative example |
| 5 | 3.9 | 1.87 | Comparative example |

TABLE 4-continued

| Heating condition of decarburization annealing (° C./sec.) | Texture (I{111}/I{411}) | Magnetic flux density B8 (T) | Remark |
|---|---|---|---|
| 20 | 2.4 | 1.90 | Inventive example |
| 40 | 2.0 | 1.92 | Inventive example |
| 50 | 2.0 | 1.93 | Inventive example |
| 75 | 1.8 | 1.95 | Inventive example |
| 100 | 1.7 | 1.96 | Inventive example |
| 125 | 1.7 | 1.96 | Inventive example |
| 150 | 1.9 | 1.94 | Inventive example |
| 200 | 1.9 | 1.93 | Inventive example |

Example 5

Slabs containing, in mass, 3.2% of Si, 0.05% of C, 0.026% of acid-soluble Al, 0.007% of N, 0.1% of Mn, 0.007% of S and 0 to 0.2% Sn were heated to 1,150° C. and hot-rolled into steel sheets 2.3 mm in thickness. The hot-rolled steel sheets were then annealed at 1,120° C., cold-rolled to the thickness of 0.22 mm, then heated to 800° C. at the heating rate of 40° C./sec., and then annealed for decarburization at 820° C. for 2 min. in a mixed gas atmosphere of nitrogen and hydrogen having the oxidizing index of 0.59. The nitrogen content of steel sheets were then controlled to 0.020 to 0.023% through annealing in a furnace atmosphere containing ammonia. Then, an annealing separator mainly composed of MgO was applied to the steel sheets and they underwent finish annealing. Then a tension coating were applied to the samples thus prepared. Table 5 shows the magnetic properties of the samples thus obtained. It can be understood from the table that the magnetic flux density (B8) increases when 0.02 to 0.15% of Sn is added.

TABLE 5

| Sn addition amount % | Texture (I{111}/I{411}) | Magnetic flux density B8 (T) |
|---|---|---|
| 0 (<0.01) | 2.9 | 1.90 |
| 0.02 | 2.4 | 1.92 |
| 0.06 | 2.0 | 1.93 |
| 0.15 | 1.7 | 1.92 |
| 0.2 | 2.2 | 1.86 |

Example 6

Slabs containing, in mass, 3.2% of Si, 0.05% of C, 0.026% of acid-soluble Al, 0.008% of N, 0.1% of Mn, and 0.007% of S were heated to 1,150° C. and hot-rolled into steel sheets 2.3 mm in thickness. The hot-rolled steel sheets were then annealed at 1,120° C., cold-rolled to the thickness of 0.27 mm, then decarburization-annealed at 820° C. under heating rates ranging from 5 to 40° C./sec., and then annealed again in a furnace atmosphere containing ammonia to regulate the nitrogen content of the steel sheets to 0.02 to 0.03%. Then, an annealing separator mainly composed of MgO was applied to the sheets and they underwent finish annealing.

Table 6 shows the property figures of the samples thus prepared. It is seen here that, when the value of I{111}/I{411} of the primary recrystallization texture is $(10\ln\{(100-R)/100\}+44)/7$ or less in relation to the cold reduction ratio R%, a high magnetic flux density with the value of B8 of 1.88 T or more is realized.

TABLE 6

| Cold reduction ratio % | X | Heating rate (° C./sec.) | Texture (I{111}/I{411}) | Magnetic flux density B8 (T) | Remark |
|---|---|---|---|---|---|
| 88.3 | 3.22 | 5 | 3.9 | 1.83 | Comparative example |
| 88.3 | 3.22 | 10 | 3.6 | 1.86 | Comparative example |
| 88.3 | 3.22 | 20 | 3.0 | 1.90 | Inventive example |
| 88.3 | 3.22 | 40 | 2.7 | 1.92 | Inventive example |

$X = (10 \ln\{(100 - R)/100\} + 44)/7$, where R is cold reduction ratio (%)

Example 7

Slabs containing, in mass, 3.3% of Si, 0.05% of C, 0.027% of acid-soluble Al, 0.007% of N, 0.1% of Cr, 0.05% of Sn, 0.1% of Mn and 0.008% of S were heated to 1,150° C. and hot-rolled into steel sheets 2.0 and 2.8 mm in thickness. The hot-rolled steel sheets were then annealed at 1,120° C. and cold-rolled to the thickness of 0.22 mm.

Then, the cold-rolled steel sheets were heated to 800° C. at heating rates ranging from 5 to 600° C./sec., and then decarburization-annealed at 800 to 890° C. for 120 sec. in an atmosphere having the oxidizing index of 0.44. At this moment, the oxygen contents of the steel sheets ranged from 1.9 to 2.1 g/m².

The steel sheets were then annealed again at 750° C. for 30 sec. in a furnace atmosphere containing ammonia to control the nitrogen content of the steel sheets to 0.023 to 0.029% by changing the ammonia content in the atmosphere. Then, an annealing separator mainly composed of magnesia was applied to the sheets and they underwent finish annealing at 1,200° C. for 20 hr.

The samples thus prepared were processed for a tension coating. Table 7 shows the properties of the samples thus obtained. It is seen in the table that, when the primary recrystallization texture (the value of I{111}/I{411}) is $(10\ln\{(100-R)/100\}+44)/7$ or less in relation to the cold reduction ratio R% (marked with Δ), the value of B8 is 1.88 T or higher; when the heating rate H° C./sec. satisfies $10^{[(R-68)/14]}<H$ in relation to the cold reduction ratio R%, (marked with ○), and more preferably, when it satisfies $10^{[(R-32)/32]}<H<140$ (marked with ⊚) the magnetic flux density (B8) is increased.

TABLE 7

| Cold reduction ratio % | X | Heating rate (° C./sec.) | Texture (I{111}/I{411}) | Magnetic flux density B8 (T) | Remark |
|---|---|---|---|---|---|
| 89.0 | 3.13 | 5 | 3.8 | 1.82 | Comparative example |
| 89.0 | 3.13 | 10 | 3.3 | 1.85 | Comparative example |
| 89.0 | 3.13 | 20 | 3.0 | 1.91 | Inventive example Δ |
| 89.0 | 3.13 | 40 | 2.6 | 1.92 | Inventive example ○ |
| 89.0 | 3.13 | 70 | 2.4 | 1.94 | Inventive example ⊚ |

TABLE 7-continued

| Cold reduction ratio % | X | Heating rate (° C./sec.) | Texture (I{111}/I{411}) | Magnetic flux density B8 (T) | Remark |
|---|---|---|---|---|---|
| 89.0 | 3.13 | 100 | 2.1 | 1.94 | Inventive example ⊚ |
| 89.0 | 3.13 | 125 | 2.0 | 1.94 | Inventive example ⊚ |
| 89.0 | 3.13 | 150 | 2.2 | 1.93 | Inventive example ○ |
| 89.0 | 3.13 | 300 | 2.3 | 1.93 | Inventive example ○ |
| 89.0 | 3.13 | 600 | 2.4 | 1.93 | Inventive example ○ |
| 92.1 | 2.65 | 5 | 3.2 | 1.78 | Comparative example |
| 92.1 | 2.65 | 10 | 2.8 | 1.83 | Comparative example |
| 92.1 | 2.65 | 20 | 2.5 | 1.88 | Inventive example △ |
| 92.1 | 2.65 | 40 | 2.2 | 1.91 | Inventive example △ |
| 92.1 | 2.65 | 70 | 1.9 | 1.93 | Inventive example ○ |
| 92.1 | 2.65 | 100 | 1.7 | 1.95 | Inventive example ⊚ |
| 92.1 | 2.65 | 125 | 1.6 | 1.95 | Inventive example ⊚ |
| 92.1 | 2.65 | 150 | 1.8 | 1.93 | Inventive example ○ |
| 92.1 | 2.65 | 300 | 1.9 | 1.93 | Inventive example ○ |
| 92.1 | 2.65 | 600 | 2.0 | 1.93 | Inventive example ○ |

$X = (10 \ln\{(100 - R)/100\} + 44)/7$, where R is cold reduction ratio (%)

Example 8

Hot-rolled silicon steel sheets 2.3 mm in thickness, containing, in mass, 3.1% of Si, 0.1% of Mn, 0.05% of C, 0.0038% of S, 0.029% of acid-soluble Al, 0.008% of N, and 0.1% of Sn, were cold-rolled to the final thickness of 0.25 mm. Then, the cold-rolled sheets were heated to 840° C. in a mixed gas atmosphere of nitrogen and hydrogen having the oxidizing index of 0.33 at the heating rates of (1) 20° C./sec. and (2) 100° C./sec., and then annealed at 840° C. for 150 sec. for primary recrystallization. Then, the sheets were annealed again at 750° C. for 30 sec. in a furnace atmosphere containing ammonia to control their nitrogen content to 0.022 to 0.026% by changing the ammonia content in the atmosphere.

Then, an annealing separator mainly composed of magnesia was applied to the steel sheets and they underwent finish annealing, wherein the steel sheets were heated to 1,200° C. at the heating rate of 15° C./sec. in the furnace atmosphere composed of 25% of $N_2$ and 75% of $H_2$, and then, changing the atmosphere to 100% $H_2$, annealed at 1,200° C. for 20 hr.

The samples thus prepared were processed for a tension coating. Table 8 shows the magnetic properties of the samples thus obtained. The effect of the present invention to improve the magnetic flux density can be confirmed therein, although these samples have lower magnetic flux densities than the samples of Examples 1 and 2, because the samples of this Example 8 were not annealed prior to the cold rolling.

TABLE 8

| Cold reduction ratio (%) | X | Heating rate (° C./sec.) | Texture (I{111}/I{411}) | Magnetic flux density B8 (T) | Remark |
|---|---|---|---|---|---|
| 88.1 | 3.12 | 20 | 3.2 | 1.874 | Comparative example |
| 88.1 | 3.12 | 100 | 2.5 | 1.909 | Inventive example |

$X = (10 \ln \{(100 - R) / 100\} + 44) / 7$, where R is cold reduction ratio (%)

Example 9

Silicon steel slabs containing, in mass, 3.1% of Si, 0.05% of C, 0.027% of acid-soluble Al, 0.008% of N, 0.1% of Mn and 0.007% of S were heated to 1,100° C. and hot-rolled into steel sheets 2.0 mm in thickness. The hot-rolled steel sheets were then annealed at 1,100° C., cold-rolled to the final thickness of 0.2 mm, then heated to 850° C. at the heating rate of 100° C./sec., and cooled to room temperature.

Then the cold-rolled steel sheets were heated at the heating rate of 30° C./sec. and annealed at 830° C. for 90 sec. in atmospheres having oxidizing indexes of 0.12 to 0.72, then annealed again at 750° C. for 30 sec. in a furnace atmosphere containing ammonia to control the nitrogen content to 0.02 to 0.03%. Then, an annealing separator mainly composed of MgO was applied to the sheets and they underwent finish annealing at 1,200° C. for 20 hr.

Table 9 shows the properties of the samples thus prepared. It is clear from the table that the glass film properties deteriorate when the oxidizing index of the furnace atmosphere is out of the range of the present invention, namely over 0.15 and 1.1 or lower, and the oxygen content after the decarburization annealing is not 2.3 g/m² or less as required in the present invention.

TABLE 9

| Heating rate (° C./sec.) | Oxidizing index of furnace atmosphere | Oxygen content (g/m²) | Magnetic flux density B8 (T) | Film defects | Remark |
|---|---|---|---|---|---|
| 100 | 0.12 | 0.59 | 1.96 | x | Comparative example |
| 100 | 0.33 | 1.74 | 1.96 | ○ | Inventive example |
| 100 | 0.44 | 1.94 | 1.96 | ○ | Inventive example |
| 100 | 0.52 | 2.19 | 1.95 | ○ | Inventive example |
| 100 | 0.72 | 2.41 | 1.65 | xx | Comparative example |

*Film defects
○: good
x: poor adhesion (Film peeling off when sample sheet is bent in 20 mm radius)
xx: defective film (Poor film formation in 5% or more of sheet surface)

Example 10

Silicon steel slabs containing, in mass, 3.2% of Si, 0.05% of C, 0.024% of acid-soluble Al, 0.007% of N, 0.1% of Cr, 0.05% of Sn, 0.1% of Mn and 0.008% of S were heated to 1,150° C. and hot-rolled into steel sheets 2.3 mm in thickness. The hot-rolled steel sheets were then annealed at 1,120° C. and cold-rolled to the thickness of 0.22 mm. The cold-rolled steel sheets were then heated to 800° C. at the heating rate of 100° C./sec., and then annealed for decarburization at 820° C. for 90 to 600 sec. in a furnace atmosphere having the oxidizing index of 0.52 to regulate the value of I{111}/I{411} to 2.7 or less, to control the primary recrystallization texture so as to satisfy the inequality specified in claim 1.

Then, the steel sheets were annealed again at 750° C. for 30 sec. in an atmosphere containing ammonia to regulate the nitrogen content to 0.023 to 0.029%. Then, an annealing separator mainly composed of MgO was applied to the sheets and they underwent finish annealing at 1,200° C. for 20 hr.

Table 10 shows the property figures of the samples thus prepared. It is seen therein that, when the oxygen content of the steel sheets is as high as 2.41 g/m², the magnetic property is deteriorated.

TABLE 10

| Soaking time (sec.) | Oxygen content (g/m²) | Magnetic flux density B8 (T) | Remark |
|---|---|---|---|
| 90 | 1.98 | 1.94 | Inventive example |
| 150 | 2.13 | 1.93 | Inventive example |
| 300 | 2.28 | 1.92 | Inventive example |
| 600 | 2.41 | 1.81 | Comparative example |

Example 11

Silicon steel slabs containing, in mass, 3.2% of Si, 0.05% of C, 0.024% of acid-soluble Al, 0.007% of N, 0.1% of Cr, 0.05% of Sn, 0.1% of Mn and 0.008% of S were heated to 1,150° C. and hot-rolled into steel sheets 2.3 mm in thickness. The hot-rolled steel sheets were then annealed at 1,120° C. and then cold-rolled to the thickness of 0.22 mm. The cold-rolled steel sheets were then heated to 800° C. at the heating rate of 100° C./sec., and then decarburization-annealed at 820° C. for 110 sec. in an atmosphere having the oxidizing index of 0.44. The value of I{111}/I{411} of the texture at this stage was 1.7 and the oxygen content of the steel sheets was 1.9 g/m².

Then the steel sheets were annealed again at 750° C. for 30 sec. in an atmosphere containing ammonia to control the nitrogen content to 0.012 to 0.026% by changing the ammonia content of the atmosphere. Then, an annealing separator mainly composed of magnesia was applied to the sheets and they underwent finish annealing at 1,200° C. for 20 hr.

Table 11 shows the property figures of the samples thus prepared. It is seen therein that, when the nitrogen content of the steel sheet after the nitriding is 0.017% or more ([N]/[Al]≧0.67), the magnetic flux density becomes high.

TABLE 11

| Nitrogen content % | [N]/[A] | Magnetic flux density B8 (T) | Remark |
|---|---|---|---|
| 0.012 | 0.50 | 1.85 | Comparative example |
| 0.017 | 0.71 | 1.93 | Inventive example |
| 0.022 | 0.92 | 1.95 | Inventive example |
| 0.026 | 1.08 | 1.94 | Inventive example |

Example 12

Silicon steel slabs containing 3.5% of Si, 0.065% of C, 0.028% of acid-soluble Al, 0.007% of N, 0.1% of Cr, 0.05% of Sn, 0.1% of Mn and 0.008% of S were heated to 1,150° C. and hot-rolled into steel sheets 2.3 mm in thickness. The hot-rolled steel sheets were then annealed at 1,120° C. and then cold-rolled to the thickness of 0.22 mm. The cold-rolled steel sheets were then heated to 800° C. at heating rates ranging from 5 to 100° C./sec., and then decarburization-annealed at 820° C. for 110 sec. in an atmosphere having the oxidizing index of 0.52.

Then the steel sheets were annealed again at 750° C. for 30 sec. in an atmosphere containing ammonia, to control the nitrogen content of the steel sheets to 0.025%. The oxygen content of all the samples was 2.2 g/m² or less. Then, an annealing separator mainly composed of MgO was applied to the steel sheets, and they were heated to 1,200° C. in the furnace atmosphere of 25% nitrogen and 75% hydrogen and then finish-annealed at 1,200° C. for 20 hr. in the hydrogen atmosphere.

Table 12 shows the property figures of the samples thus prepared. It is confirmed in the table that the magnetic property of the steel sheets is enhanced when the heating rate of the decarburization annealing is raised.

TABLE 12

| Heating rate (° C./sec.) | Magnetic flux density B8 (T)/(B8/Bs) | Remark |
| --- | --- | --- |
| 5 | 1.84 (0.92) | Comparative example |
| 25 | 1.90 (0.95) | Inventive example |
| 30 | 1.91 (0.96) | Inventive example |
| 50 | 1.93 (0.97) | Inventive example |
| 100 | 1.93 (0.97) | Inventive example |

Example 13

Silicon steel slabs containing 3.3% of Si, 0.06% of C, 0.028% of acid-soluble Al, 0.007% of N, 0.1% of Cr, 0.05% of Sn, 0.1% of Mn and 0.008% of S, were heated to 1,150° C. and hot-rolled into steel sheets 2.0 mm in thickness. The hot-rolled steel sheets were then held at 1,120° C. for 30 sec. and annealed by holding at 900° C. for 30 sec. and then cold-rolled to the thickness of 0.2 mm. The cold-rolled steel sheets were then heated to 800° C. at the heating rate of 40° C./sec., and then decarburization-annealed at 830° C. for 110 sec. in atmospheres having the oxidizing indexes ranging from 0.33 to 0.72. Then the steel sheets were annealed again at 750° C. for 30 sec. in an atmosphere containing ammonia to control their nitrogen content to 0.022%. After that, an annealing separator mainly composed of magnesia was applied to the sheets, and they were heated to 1,200° C. in the furnace atmosphere of 25% nitrogen and 75% hydrogen and then finish-annealed at 1,200° C. for 20 hr. in the hydrogen atmosphere. Table 13 shows that the secondary recrystallization becomes unstable and the magnetic flux density (B8) lowers when the oxygen content of the steel, sheets exceeds 2.3 g/m².

TABLE 13

| Oxidizing index (%) | Oxygen content of steel sheet (g/mm²) | Magnetic flux density B8 (T) | Remark |
| --- | --- | --- | --- |
| 0.33 | 1.58 | 1.95 (0.97) | Inventive example |
| 0.44 | 1.77 | 1.94 (0.96) | Inventive example |
| 0.52 | 1.91 | 1.93 (0.96) | Inventive example |
| 0.59 | 2.20 | 1.92 (0.95) | Inventive example |
| 0.72 | 2.38 | 1.78 (0.88) | Comparative example |

Example 14

Silicon steel slabs containing 4.1% of Si, 0.07% of C, 0.03% of acid-soluble Al, 0.007% of N, 0.1% of Cr, 0.05% of Sn, 0.1% of Mn and 0.008% of S were heated to 1,150° C. and hot-rolled into steel sheets 2.0 mm in thickness. The hot-rolled steel sheets were then held at 1,120° C. for 30 sec. and annealed by holding them at 900° C. for 30 sec. and then cold-rolled to the thickness of 0.2 mm. The cold-rolled steel sheets were then heated to 800° C. at the heating rate of 50° C./sec., and then annealed for decarburization at 830° C. for 110 sec. in furnace atmospheres having the oxidizing indexes ranging from 0.33 to 0.72. Then the steel sheets were annealed again at 750° C. for 30 sec. in an atmosphere containing ammonia to regulate their nitrogen content to 0.022%. After that, an annealing separator mainly composed of magnesia was applied to the sheets, and they were heated to 1,200° C. in the furnace atmosphere of 25% nitrogen and 75% hydrogen and then finish-annealed at 1,200° C. for 20 hr. in the hydrogen atmosphere.

Table 14 shows that the secondary recrystallization becomes unstable and the magnetic flux density (B8) lowers when the oxygen content of the steel sheets exceeds 2.3 g/m².

TABLE 14

| Oxidizing index (%) | Oxygen content of steel sheet (g/mm²) | Magnetic flux density B8 (T) | Remark |
| --- | --- | --- | --- |
| 0.33 | 1.73 | 1.92 (0.97) | Inventive example |
| 0.44 | 1.94 | 1.91 (0.97) | Inventive example |
| 0.52 | 2.06 | 1.91 (0.97) | Inventive example |
| 0.59 | 2.39 | 1.78 (0.90) | Comparative example |
| 0.72 | 2.61 | 1.71 (0.87) | Comparative example |

Example 15

The cold-rolled steel sheets used in Example 1 were heated to 800° C. at the heating rate of 40° C./sec., and then decarburization-annealed at 820° C. for 110 sec. in an atmosphere having the oxidizing index of 0.52. Then the steel sheets were annealed again at 750° C. for 30 sec. in a furnace atmosphere containing ammonia to change their nitrogen content by regulating the ammonia content of the atmosphere.

After that, an annealing separator mainly composed of magnesia was applied to the steel sheets, and they underwent finish annealing, wherein they were heated to 1,200° C. at the heating rate of 15° C./sec. in the furnace atmosphere of 25% nitrogen and 75% hydrogen and then annealed at 1,200° C. for 20 hr. after changing the furnace atmosphere to 100% hydrogen.

Table 15 demonstrates that a high magnetic flux density is obtained when the value of [N]/[Al] is 0.5 or more.

TABLE 15

| Nitrogen content % | [N]/[Al] | Magnetic flux density B8 (T) | Remark |
| --- | --- | --- | --- |
| 0.012 | 0.43 | 1.68 (0.84) | Comparative example |
| 0.017 | 0.61 | 1.90 (0.95) | Inventive example |
| 0.022 | 0.79 | 1.92 (0.96) | Inventive example |
| 0.026 | 0.93 | 1.93 (0.97) | Inventive example |

Example 16

Slabs containing, in mass, 3.4% of Si, 0.06% of C, 0.027% of acid-soluble Al, 0.07% of N, 0.1% of Mn, 0.007% of S and 0 to 0.2% of Sn were heated to 1,150° C. and hot-rolled into steel sheets 1.8 mm in thickness.

The hot-rolled steel sheets were then held at 1,120° C. for 30 sec. and annealed by holding at 900° C. for 30 sec. and then cold-rolled to the thickness of 0.2 mm, The cold-rolled steel sheets were then heated to 800° C. at the heating rate of 40° C./sec., and then annealed for decarburization at 820° C. for 2 min in a mixed atmosphere of nitrogen and hydrogen having the oxidizing index of 0.52. Then the steel sheets were annealed again in an atmosphere containing ammonia to control their nitrogen content to 0.018 to 0.022%. After that, an annealing separator mainly composed of MgO was applied to the steel sheets, and they were heated to 1,200° C. at the heating rate of 15° C./sec. in the furnace atmosphere of 25% nitrogen and 75% hydrogen, and then finish-annealed at 1,200° C. for 20 hr. after changing the atmosphere to 100% hydrogen. Table 16 shows the magnetic properties of the samples thus prepared. It is seen in the table that the magnetic flux density (B8) is enhanced when Sn is added by 0.02 to 0.15%.

TABLE 16

| Sn addition amount (%) | Oxygen content of steel sheet (g/mm²) | Magnetic flux density B8 (T) | Remark |
|---|---|---|---|
| (1) 0(<0.01) | 2.15 | 1.91 (0.95) | Inventive example |
| (2) 0.02 | 2.11 | 1.92 (0.96) | Inventive example |
| (3) 0.06 | 2.03 | 1.93 (0.96) | Inventive example |
| (4) 0.15 | 1.96 | 1.92 (0.96) | Inventive example |
| (5) 0.2 | 1.83 | 1.90 (0.95) | Inventive example |

Example 17

Slabs containing, in mass, 3.4% of Si, 0.06% of C, 0.027% of acid-soluble Al, 0.07% of N, 0.1% of Mn, 0.007% of S, and 0 to 0.2% of Sn were heated to 1,150° C. and hot-rolled into steel sheets 1.8 mm in thickness.

The hot-rolled steel sheets were then held at 1,120° C. for 30 sec. and annealed by holding at 900° C. for 30 sec. and then cold-rolled to the thickness of 0.2 mm. The cold-rolled steel sheets were then heated to 800° C. at the heating rates of (1) 20° C./sec. and (2) 40° C./sec., and then decarburization-annealed at 820° C. for 2 min. in a mixed atmosphere of nitrogen and hydrogen having the oxidizing index of 0.52. Then the steel sheets were annealed again in an atmosphere containing ammonia to control their nitrogen content to 0.018 to 0.022%. The oxygen contents of all the samples were 2.3 g/m².

After that, an annealing separator mainly composed of MgO was applied to the sheets, and they underwent finish annealing, wherein: they were heated to 900° C. in the furnace atmosphere of 25% nitrogen and 75% hydrogen; then continued being heated from 900 to 1,200° C. in (A) the atmosphere of 25% nitrogen and 75% hydrogen and (B) another of 75% nitrogen and 25% hydrogen; and then annealed at 1,200° C. for 20 hr. after changing the atmosphere to 100% hydrogen.

From Table 17 it can be understood that the magnetic flux density (B8) increases when the heating rate is increased, and that the magnetic flux density (B8) increases yet more when precipitates are controlled by regulating the partial pressure of nitrogen during the finish annealing to a prescribed range in relation to the Si content of the steel sheet as disclosed in Japanese Unexamined Patent Publication No. H6-17129.

TABLE 17

| Heating rate (° C./sec.) | Furnace atmosphere of finish annealing | Magnetic flux density B8 (T) | Remark |
|---|---|---|---|
| 20 | (A) | 1.89 (0.94) | Inventive example |
| 20 | (B) | 1.91 (0.95) | Inventive example |
| 40 | (A) | 1.92 (0.96) | Inventive example |
| 40 | (B) | 1.94 (0.97) | Inventive example |

Example 18

Hot-rolled silicon steel sheets 2.3 mm in thickness, containing, in mass, 3.3% of Si, 0.1% of Mn, 0.05% of C, 0.007% of S, 0.03% of acid-soluble Al, 0.008% of N and 0.05% of Sn were annealed at 1,100° C. for 2 min. and then cold-rolled to the final thickness of 0.22 mm. The cold-rolled steel sheets were then heated to 830° C. in a mixed atmosphere of nitrogen and hydrogen having the oxidizing index of 0.06 at the heating rates of 10, 20, 40, 50, 100 and 300° C./sec. and annealed at 830° C. for 90 sec. Then the steel sheets were annealed again in an atmosphere containing ammonia to control their nitrogen content to 0.025% for the purpose of intensifying the inhibitor. After that, an annealing separator mainly composed of alumina ($Al_2O_3$) was applied to the sheets, and they underwent finish annealing, wherein they were heated to 1,200° C. in the atmosphere of 100% nitrogen at the heating rate of 15° C./hr. and annealed at 1,200° C. for 20 hr. after changing the atmosphere to 100% hydrogen. The samples thus prepared underwent a tension coating processing and then were subjected to laser irradiation for finely dividing the magnetic domains. The magnetic properties of the samples thus prepared are listed in Table 18.

TABLE 18

| Heating rate of decarburization annealing (° C./sec.) | Texture (I{111}/I{411}) | Magnetic flux density B8 (T) | Core loss W17/50 (W/kg) | Remark |
|---|---|---|---|---|
| 10 | 3.5 | 1.913 | 0.76 | Comparative example |
| 20 | 2.6 | 1.922 | 0.73 | Comparative example |
| 40 | 2.2 | 1.938 | 0.69 | Inventive example |
| 50 | 1.9 | 1.941 | 0.68 | Inventive example |
| 100 | 1.7 | 1.945 | 0.67 | Inventive example |
| 300 | 1.8 | 1.943 | 0.67 | Inventive example |

Example 19

Hot-rolled silicon steel sheets 1.8 mm in thickness, containing, in mass, 3.3% of Si, 0.1% of Mn, 0.05% of C, 0.007% of S, 0.027% of acid-soluble Al, 0.008% of N, 0.1% of Sn and 0.1% of Cr were annealed at 1,120° C. for 2 min. and then cold-rolled to the final thickness of 0.17 mm. Then, the steel sheets were brought to undergo primary recrystallization in the following manner: (A) some of them were heated to 840° C. at the heating rate of 20° C./sec. and then annealed at the temperature for 70 sec. in a mixed gas of nitrogen and hydrogen having the oxidizing index of 0.06; and (B) the others were heated to 550° C. at the heating rate of 20° C./sec., then from the temperature to 840° C. at the heating rate of 100° C./sec. and then annealed at the temperature for 70 sec. in the same mixed gas as (A). After that, an annealing separator mainly composed of alumina ($Al_2O_3$) was applied to the sheets, and they underwent finish annealing, wherein they were heated to 1,200° C. in the atmosphere of 90% nitrogen and 10% hydrogen at the heating rate of 15° C./hr. and then annealed at 1,200° C. for 20 hr. after changing the atmosphere to 100% hydrogen. Subsequently, a tension coating was applied to the sample sheets. The magnetic properties of the samples thus prepared are listed in Table 19.

TABLE 19

| Condition of decarburization annealing | Texture (I{111}/I{411}) | Magnetic flux density B8 (T) | Core loss W17/50(W/kg) | Remark |
|---|---|---|---|---|
| (A) | 2.8 | 1.922 | 0.87 | Comparative example |
| (B) | 2.1 | 1.948 | 0.79 | Inventive example |

Example 20

Hot-rolled silicon steel sheets 2.3 mm in thickness, containing, in mass, 3.1% of Si, 0.1% of Mn, 0.05% of C, 0.008% of S, 0.029% of acid-soluble Al, 0.008% of N, and 0.1% of Sn were cold-rolled to the final thickness of 0.25 mm. Then, the cold-rolled steel sheets were brought to undergo primary recrystallization by heating to 840° C. at the heating rates of 20 and 100° C./sec. and then annealing at 840° C. for 150 sec. in a mixed gas atmosphere of nitrogen and hydrogen having the oxidizing index of 0.011.

After that, an annealing separator mainly composed of alumina ($Al_2O_3$) was applied to the sheets, and they underwent finish annealing, wherein they were heated to 1,200° C. in the atmosphere of 100% nitrogen at the heating rate of 15° C./hr. and annealed at 1,200° C. for 20 hr. after changing the atmosphere to 100% hydrogen. Subsequently, a tension coating was applied to the sample sheets.

Table 20 lists the magnetic properties of the samples thus prepared. The effect of the present invention to improve the magnetic flux density can be confirmed therein, despite the fact that the magnetic flux densities of these samples are lower than those of the samples of Examples 1 to 3, because the samples of this Example 20 were not annealed prior to the cold rolling.

TABLE 20

| Heating condition of decarburization annealing (° C./sec.) | Texture (I{111}/I{411}) | Magnetic flux density B8 (T) | Core loss W17/50 (W/kg) | Remark |
|---|---|---|---|---|
| 20 | 3.4 | 1.881 | 0.99 | Comparative example |
| 100 | 2.2 | 1.912 | 0.93 | Inventive example |

Example 21

Silicon steel slabs containing, in mass, 3.3% of Si, 0.05% of C, 0.027% of acid-soluble Al, 0.007% of N, 0.1% of Cr, 0.05% of Sn, 0.1% of Mn and 0.008% of S were heated to 1,150° C. and hot-rolled into steel sheets 2.3 mm in thickness. The hot-rolled steel sheets were annealed at 1,120° C. and then cold-rolled to the thickness of 0.22 mm. The cold-rolled steel sheets were then heated to 820° C. at heating rates ranging from 3 to 200° C./sec., and then decarburization-annealed at 820° C. for 110 sec. in a furnace atmosphere having the oxidizing index of 0.12. The oxygen contents of the steel sheets at this stage ranged from 1.9 to 2.1 g/m². Then the steel sheets were annealed again at 750° C. for 30 sec. in an atmosphere containing ammonia to control their nitrogen content to 0.023 to 0.029% by changing the ammonia content of the atmosphere. After that, an annealing separator mainly composed of alumina was applied to the sheets, and they were finish-annealed at 1,200° C. for 20 hr. The samples thus prepared were processed for a tension coating.

Table 21 shows the magnetic properties of the samples thus prepared. It is understood from the table that the magnetic flux density (B8) is enhanced when the heating rate is 40° C./sec. or higher or, more preferably, when it is in the range from 75 to 125° C./sec.

TABLE 21

| Heating condition of decarburization annealing (° C./sec.) | Texture (I{111}/I{411}) | Magnetic flux density B8 (T) | Remark |
|---|---|---|---|
| 3 | 4.5 | 1.87 | Comparative example |
| 5 | 3.9 | 1.88 | Comparative example |
| 20 | 2.6 | 1.92 | Comparative example |
| 40 | 2.0 | 1.94 | Inventive example |
| 50 | 2.0 | 1.94 | Inventive example |
| 75 | 1.8 | 1.96 | Inventive example |
| 100 | 1.7 | 1.97 | Inventive example |
| 125 | 1.7 | 1.95 | Inventive example |
| 150 | 1.9 | 1.93 | Inventive example |
| 200 | 1.9 | 1.93 | Inventive example |

Example 22

Silicon steel slabs containing, in mass, 3.2% of Si, 0.05% of C, 0.026% of acid-soluble Al, 0.007% of N, 0.1% of Mn, 0.007% of S and 0 to 0.2% of Sn were heated to 1,150° C. and hot-rolled into steel sheets 2.3 mm in thickness. The hot-rolled steel sheets were annealed at 1,120° C. and then cold-rolled to the thickness of 0.22 m. The cold-rolled steel sheets were then heated to 800° C. at the heating rate of 40° C./sec., and then decarburization-annealed at 820° C. for 2 min in a mixed furnace atmosphere of nitrogen and hydrogen having the oxidizing index of 0.59. Then the steel sheets were annealed again in an atmosphere containing ammonia to control their nitrogen content to 0.020 to 0.023%. After that, an annealing separator mainly composed of MgO was applied to the sheets, and they were finish-annealed. The samples thus prepared were processed for a tension coating.

Table 22 shows the magnetic properties of the samples thus prepared. It is clear from the table that the magnetic flux density (B8) is enhanced by adding Sn by 0.02 to 0.15%.

TABLE 22

| Sn addition amount (%) | Texture (I{111}/I{411}) | Magnetic flux density B8 (T) |
|---|---|---|
| 0 (<0.01) | 2.9 | 1.91 |
| 0.02 | 2.4 | 1.93 |
| 0.06 | 2.0 | 1.95 |
| 0.15 | 1.7 | 1.94 |
| 0.2 | 2.2 | 1.88 |

Example 23

Slabs containing, in mass, 3.2% of Si, 0.05% of C, 0.026% of acid-soluble Al, 0.008% of N, 0.1% of Mn, and 0.007% of S were heated to 1,150° C. and hot-rolled into steel sheets 2.6 mm in thickness. The hot-rolled steel sheets were then annealed at 1,120° C. and cold-rolled to the thickness of 0.27 mm. Then, the cold-rolled steel sheets were decarburization-annealed at 820° C. at heating rates of 5 to 40° C./sec. and then annealed again in a furnace atmosphere containing ammonia to control the nitrogen content of the steel sheets to 0.020 to 0.03%. Then, an annealing separator mainly composed of alumina ($Al_2O_3$) was applied to the sheets and they underwent finish annealing.

The properties of the samples are listed in Table 23. It is seen therein that, when the value of $I\{111\}/I\{411\}$ of the primary recrystallization texture is $(20 \ln\{(100-R)/100\}+81)/14$ or less in relation to the cold reduction ratio R%, a high magnetic flux density with the value of B8 of 1.93 T or more is realized.

C./sec. The cold-rolled steel sheets were subsequently decarburization-annealed at 800 to 890° C. for 120 sec. in a furnace atmosphere having the oxidizing index of 0.12, in order to control the primary recrystallization texture so that it falls within the zone to realize a high value of B8 shown in FIG. 1. Then the steel sheets were annealed again at 750° C. for 30 sec. in a furnace atmosphere containing ammonia to control the nitrogen content of steel sheets to 0.025 to 0.035% by changing the ammonia content of the atmosphere. Then, an annealing separator mainly composed of alumina was applied to the sheets and they underwent finish annealing at 1,200° C. for 20 hr.

The samples thus prepared underwent a tension coating processing and then were subjected to laser irradiation for finely dividing the magnetic domains. The properties of the samples thus prepared are listed in Table 24. It is seen in the table that, when the value of $I\{111\}/I\{411\}$ of the primary

TABLE 23

| Cold reduction ratio (%) | X | Heating rate (° C./sec.) | Texture ($I\{111\}/I\{411\}$) | Magnetic flux density B8 (T) | Remark |
|---|---|---|---|---|---|
| 89.6 | 2.55 | 5 | 3.6 | 1.83 | Comparative example |
| 89.6 | 2.55 | 10 | 3.1 | 1.87 | Comparative example |
| 89.6 | 2.55 | 20 | 2.8 | 1.91 | Comparative example |
| 89.6 | 2.55 | 40 | 2.4 | 1.94 | Inventive example |

$X = (20 \ln \{(100 - R) / 100\} + 81) / 14$, where R is cold reduction ratio (%)

Example 24

Slabs containing, in mass, 3.3% of Si, 0.05% of C, 0.027% of acid-soluble Al, 0.007% of N, 0.1% of Cr, 0.05% of Sn, 0.1% of Mn and 0.008% of S were heated to 1,150° C. and hot-rolled into steel sheets 2.0, 2.3 and 3.2 mm in thickness. The hot-rolled steel sheets were then annealed at 1,120° C., cold-rolled to the thickness of 0.22 mm, then heated to 800° C. at heating rates ranging from 10 to 600° C./sec.

recrystallization texture is $(20 \ln\{(100-R)/100\}+81)/14$ or less in relation to the cold reduction ratio R% (marked with Δ), the value of B8 is 1.93 T or higher; when the heating rate H° C./sec. satisfies the expression $10^{[(R-68)/14]} < H$ in relation to the cold reduction ratio R% (marked with ○) and more preferably, when it satisfies the expression $10^{[(R-32)/32]} < H < 140$ (marked with ⊚), the magnetic flux density (B8) is increased.

TABLE 24

| Cold reduction ratio (%) | X | Heating rate (° C./sec.) | Texture ($I\{111\}/I\{411\}$) | Magnetic flux density B8 (T) | Core loss $W_{17/50}$ {W/kg} | Remark |
|---|---|---|---|---|---|---|
| 89.0 | 2.63 | 25 | 2.9 | 1.92 | 0.73 | Comparative example |
| 89.0 | 2.63 | 40 | 2.5 | 1.94 | 0.68 | Inventive example ○ |
| 89.0 | 2.63 | 60 | 2.4 | 1.94 | 0.68 | Inventive example ○ |
| 89.0 | 2.63 | 80 | 2.2 | 1.95 | 0.67 | Inventive example ⊚ |
| 89.0 | 2.63 | 100 | 2.1 | 1.95 | 0.65 | Inventive example ⊚ |
| 89.0 | 2.63 | 125 | 2.0 | 1.95 | 0.66 | Inventive example ⊚ |
| 89.0 | 2.63 | 150 | 2.2 | 1.94 | 0.68 | Inventive example ○ |
| 89.0 | 2.63 | 300 | 2.3 | 1.93 | 0.70 | Inventive example ○ |
| 89.0 | 2.63 | 600 | 2.3 | 1.93 | 0.71 | Inventive example ○ |
| 90.4 | 2.43 | 25 | 2.8 | 1.92 | 0.75 | Comparative example |
| 90.4 | 2.43 | 40 | 2.4 | 1.94 | 0.69 | Inventive example ○ |
| 90.4 | 2.43 | 60 | 2.2 | 1.94 | 0.68 | Inventive example ○ |
| 90.4 | 2.43 | 80 | 2.1 | 1.95 | 0.65 | Inventive example ⊚ |
| 90.4 | 2.43 | 100 | 1.8 | 1.96 | 0.63 | Inventive example ⊚ |
| 90.4 | 2.43 | 125 | 1.8 | 1.95 | 0.64 | Inventive example ⊚ |
| 90.4 | 2.43 | 150 | 1.9 | 1.94 | 0.67 | Inventive example ○ |
| 90.4 | 2.43 | 300 | 2.0 | 1.94 | 0.67 | Inventive example ○ |
| 90.4 | 2.43 | 600 | 2.0 | 1.94 | 0.69 | Inventive example ○ |
| 93.1 | 1.96 | 25 | 2.2 | 1.90 | 0.79 | Comparative example |
| 93.1 | 1.96 | 40 | 2.0 | 1.92 | 0.73 | Comparative example |
| 93.1 | 1.96 | 60 | 1.8 | 1.93 | 0.70 | Inventive example Δ |

TABLE 24-continued

| Cold reduction ratio (%) | X | Heating rate (° C./sec.) | Texture (I{111}/I{411}) | Magnetic flux density B8 (T) | Core loss $W_{17/50}$ {W/kg} | Remark |
|---|---|---|---|---|---|---|
| 93.1 | 1.96 | 80  | 1.8 | 1.94 | 0.67 | Inventive example ○ |
| 93.1 | 1.96 | 100 | 1.6 | 1.96 | 0.62 | Inventive example ⊙ |
| 93.1 | 1.96 | 125 | 1.6 | 1.96 | 0.63 | Inventive example ⊙ |
| 93.1 | 1.96 | 150 | 1.7 | 1.94 | 0.68 | Inventive example ○ |
| 93.1 | 1.96 | 300 | 1.8 | 1.94 | 0.67 | Inventive example ○ |
| 93.1 | 1.96 | 600 | 1.9 | 1.94 | 0.68 | Inventive example ○ |

X = (20 ln {(100 − R) / 100} + 81) / 14, where R is cold reduction ratio (%)

Example 25

Hot-rolled silicon steel sheets 2.3 mm in thickness, containing, in mass, 3.1% of Si, 0.1% of Mn, 0.05% of C, 0.008% of S, 0.029% of acid-soluble Al, 0.008% of N, and 0.1% of Sn, were cold-rolled to the final thickness of 0.25 mm. Then, the cold-rolled sheets were heated to 840° C. in a mixed gas atmosphere of nitrogen and hydrogen having the oxidizing index of 0.10 at the heating rates of (1) 20° C./sec. and (2) 100° C./sec., and then annealed at 840° C. for 150 sec. for primary recrystallization. Then, the sheets were annealed again at 750° C. for 30 sec. in a furnace atmosphere containing ammonia to regulate their nitrogen content to 0.02 to 0.03% by changing the ammonia content of the atmosphere.

Then, an annealing separator mainly composed of alumina was applied to the sheets and hey underwent finish annealing, wherein the steel sheets were heated to 1,200° C. at the heating rate of 15° C./sec. in the furnace atmosphere composed of 25% of $N_2$ and 75% of $H_2$, and then, changing the atmosphere to 100% $H_2$, annealed at 1,200° C. for 20 hr.

The samples thus prepared received a tension coating. The magnetic properties of the samples thus prepared are listed in Table 25. The effect of the present invention to improve the magnetic flux density can be confirmed therein, although these samples have lower magnetic flux densities than the samples of Examples 23 and 24, because the samples of this Example 25 were not annealed prior to the cold rolling.

TABLE 25

| Cold reduction ratio (%) | X | Heating rate (° C./sec.) | Texture (I{111}/I{411}) | Magnetic flux density B8 (T) | Remark |
|---|---|---|---|---|---|
| 89.1 | 2.62 | 20  | 3.1 | 1.877 | Comparative example |
| 89.1 | 2.62 | 100 | 2.4 | 1.913 | Inventive example |

X = (20 ln{(100 − R)/100} + 81)/14, where R is cold reduction ratio (%)

What is claimed is:

1. A method to produce a grain-oriented electrical steel sheet having a high magnetic flux density by heating a silicon steel, comprising, in mass %, 0.8 to 4.8% of Si,
0.085% or less of C,
0.01 to 0.065% of Sol. Al and
0.012% or less of N, with the balance consisting of Fe and unavoidable impurities, to a heating temperature of 1,280° C. or below, hot-rolling the heated silicon steel into a steel sheet, cold-rolling the steel sheet in one cold rolling step or two or more cold rolling steps with an intermediate annealing in between to a final thickness, annealing the cold-rolled sheet for decarburization, applying an annealing separator composed mainly of magnesia, and then conducting finish annealing, in this sequential order, characterized by: controlling the ratio I{111}/I{411} in the texture after the decarburization annealing so as not to exceed 3.0; controlling the oxygen content of an oxide layer of the decarburization annealed steel sheet so as not to exceed 2.3 g/m², and after decarburization annealing, nitriding the steel sheet.

2. A method to produce a grain-oriented, electrical steel sheet having a high magnetic flux density according to claim 1, characterized by heating the steel sheet, in a heating process of the decarburization annealing, at a heating rate H° C./sec. satisfying the expression $10^{[(R-32)/32]}<H<140$ from a temperature of 600° C. or below to a prescribed temperature in the range from 750 to 900° C.

3. A method to produce a grain-oriented electrical steel sheet having a high magnetic flux density according to claim 1, characterized by heating the steel sheet, in a heating process of the decarburization annealing, under a condition to satisfy the expression H° C./sec.≧10×[Si %]−15, where [Si %] is the Si content of the steel sheet and H is the heating rate.

4. A method to produce a grain-oriented electrical steel sheet having a high magnetic flux density according to claim 1, characterized by applying the nitriding treatment so that the content of N [N] may satisfy the expression [N]/[Al] ≧0.67 in relation to the content of acid-soluble Al [Al] of the steel sheet after the nitriding process.

5. A method to produce a grain-oriented electrical steel sheet having a high magnetic flux density according to claim 1, characterized by heating the steel sheet, in a heating process of the decarburization annealing, at a heating rate H° C./sec. satisfying the expression $10^{\{(R-68)/14\}}<H$ from a temperature of 600° C. or below to a prescribed temperature in the range from 750 to 900° C.

6. A method to produce a grain-oriented electrical steel sheet having a high magnetic flux density according to claim 1, characterized by heating the steel sheet, in a heating process of the decarburization annealing, at a heating rate H° C./sec. satisfying the expression $10^{\{(R-68)/14\}}<H$ from a temperature of 600° C. or below to a prescribed temperature in the range from 750 to 900° C., and then heating under an oxidizing index ($PH_2O/PH_2$) of the annealing atmosphere gas exceeding 0.15 but not exceeding 1.1 in a temperature range from 770 to 900° C.

* * * * *

UNITED STATES PATENT AND TRADEMARK OFFICE
CERTIFICATE OF CORRECTION

PATENT NO. : 6,613,160 B2  
DATED : September 2, 2003  
INVENTOR(S) : Yoshiyuki Ushigami et al.

It is certified that error appears in the above-identified patent and that said Letters Patent is hereby corrected as shown below:

Column 22,
Line 49, change "(marked with O)" to -- (marked with ◎) --

Signed and Sealed this

Ninth Day of August, 2005

JON W. DUDAS  
*Director of the United States Patent and Trademark Office*